United States Patent
Suzuki et al.

(10) Patent No.: US 11,028,323 B2
(45) Date of Patent: *Jun. 8, 2021

(54) LIQUID CRYSTAL ALIGNING AGENT CONTAINING CROSSLINKING AGENT AND POLYMER THAT HAS SITE HAVING ISOCYANATE GROUP AND/OR BLOCKED ISOCYANATE GROUP AND SITE HAVING PHOTOREACTIVITY, LIQUID CRYSTAL ALIGNMENT FILM, AND LIQUID CRYSTAL DISPLAY ELEMENT

(71) Applicant: NISSAN CHEMICAL INDUSTRIES, LTD., Chiyoda-ku (JP)

(72) Inventors: Kanako Suzuki, Funabashi (JP); Masato Moriuchi, Funabashi (JP); Ryoichi Ashizawa, Funabashi (JP); Kohei Goto, Funabashi (JP)

(73) Assignee: NISSAN CHEMICAL INDUSTRIES, LTD., Chiyoda-ku (JP)

( * ) Notice: Subject to any disclaimer, the term of this patent is extended or adjusted under 35 U.S.C. 154(b) by 270 days.

This patent is subject to a terminal disclaimer.

(21) Appl. No.: 16/066,438

(22) PCT Filed: Dec. 27, 2016

(86) PCT No.: PCT/JP2016/088868
§ 371 (c)(1),
(2) Date: Oct. 11, 2018

(87) PCT Pub. No.: WO2017/115790
PCT Pub. Date: Jul. 6, 2017

(65) Prior Publication Data
US 2019/0023987 A1    Jan. 24, 2019

(30) Foreign Application Priority Data
Dec. 28, 2015 (JP) .............................. JP2015-256572

(51) Int. Cl.
| | |
|---|---|
| C08G 18/81 | (2006.01) |
| C08L 75/14 | (2006.01) |
| C09K 19/56 | (2006.01) |
| C08F 120/20 | (2006.01) |
| C08F 220/30 | (2006.01) |
| C08F 220/36 | (2006.01) |
| C08L 75/04 | (2006.01) |
| C08G 18/08 | (2006.01) |
| C08G 18/32 | (2006.01) |
| C08G 18/67 | (2006.01) |
| G02F 1/1337 | (2006.01) |

(52) U.S. Cl.
CPC ............ *C09K 19/56* (2013.01); *C08F 120/20* (2013.01); *C08F 220/30* (2013.01); *C08F 220/36* (2013.01); *C08G 18/08* (2013.01); *C08G 18/3215* (2013.01); *C08G 18/3243* (2013.01); *C08G 18/3284* (2013.01); *C08G 18/6755* (2013.01); *C08G 18/8116* (2013.01); *C08G 18/8166* (2013.01); *C08G 18/8175* (2013.01); *C08L 75/04* (2013.01); *C08L 75/14* (2013.01); *G02F 1/133711* (2013.01); *G02F 1/133742* (2021.01); *G02F 1/133788* (2013.01)

(58) Field of Classification Search
CPC ..... C09K 19/56; G02F 1/33711; C08L 75/04; C08L 75/14; C08G 18/8166; C08G 18/8116; C08G 18/8175; C08G 18/08; C08G 18/3284; C08G 18/3243; C08G 18/3215
See application file for complete search history.

(56) References Cited

U.S. PATENT DOCUMENTS

| | | |
|---|---|---|
| 2004/0188653 A1 | 9/2004 | Kataoka et al. |
| 2010/0085523 A1 | 4/2010 | Terashita et al. |
| | (Continued) | |

FOREIGN PATENT DOCUMENTS

| | | |
|---|---|---|
| JP | 2005-187618 A | 7/2005 |
| JP | 4504626 B2 | 7/2010 |
| | (Continued) | |

OTHER PUBLICATIONS

International Search Report dated Apr. 11, 2017 in PCT/JP2016/088868, 4 pages.

*Primary Examiner* — Michael L Leonard
(74) *Attorney, Agent, or Firm* — Oblon, McClelland, Maier & Neustadt, L.L.P.

(57) ABSTRACT

Provided is a liquid crystal display element that can be baked at a low temperature when forming a liquid crystal alignment film capable of imparting an alignment regulating property and a pretilt angle developing property via a photoalignment method. Further provided is a liquid crystal display element in which the liquid crystal pretilt angles are highly stable, and display burn-in hardly occurs even due to long usage. Further provided are a vertical liquid crystal alignment film to be used in the liquid crystal display element, and a liquid crystal aligning agent with which it is possible to provide the vertical liquid crystal alignment film. A liquid crystal aligning agent of the present invention contains: component (A), which is a polymer including (A-1) a site having an isocyanate group and/or a blocked isocyanate group and (A-2) a site having photoreactivity; component (B), which is a compound having, in a molecule, at least two functional groups of at least one type selected from the group consisting of an amino group and a hydroxyl group; and an organic solvent.

14 Claims, No Drawings

(56) References Cited

U.S. PATENT DOCUMENTS

2011/0135850 A1    6/2011  Saha et al.
2013/0331482 A1   12/2013  Tanabe et al.
2016/0369025 A1*  12/2016  Yukawa .................. G02B 1/04

FOREIGN PATENT DOCUMENTS

| JP | 4995267 B2      | 8/2012 |
| JP | 2013-513017 A   | 4/2013 |
| JP | 2014-12823 A    | 1/2014 |
| KR | 10-2013-0073024 A | 7/2013 |

\* cited by examiner

LIQUID CRYSTAL ALIGNING AGENT CONTAINING CROSSLINKING AGENT AND POLYMER THAT HAS SITE HAVING ISOCYANATE GROUP AND/OR BLOCKED ISOCYANATE GROUP AND SITE HAVING PHOTOREACTIVITY, LIQUID CRYSTAL ALIGNMENT FILM, AND LIQUID CRYSTAL DISPLAY ELEMENT

TECHNICAL FIELD

The present invention relates to a liquid crystal alignment agent comprising a polymer having a side chain having or evolving an isocyanate group and a side chain having photoreactivity, a liquid crystal alignment film obtained therefrom, and a liquid crystal display element having the resulting liquid crystal alignment film.

BACKGROUND ART

In a liquid crystal display element, a liquid crystal alignment film plays a role of aligning liquid crystal in a certain direction.

At present, major liquid crystal alignment films used in the industrial field are made by applying a polyimide liquid crystal aligning agent composed of polyamic acid or polyamic acid ester, which is a polyimide precursor, or a polyimide solution to a substrate, and forming a film.

Further, when liquid crystal is aligned in parallel or obliquely with the substrate surface, after film formation, the surface is further subjected to drawing treatment by rubbing.

On the other hand, when liquid crystal is oriented vertically to the substrate (referred to as vertical alignment (VA) system), a liquid crystal alignment film having a hydrophobic group such as a long-chain alkyl group in the side chain of polyimide is used. In this case, when the liquid crystal molecules are inclined toward the direction parallel to the substrate by application of a voltage between the substrates, the liquid crystal molecules need to be inclined toward one direction within the substrate surface from the normal direction of the substrate. As the methods for this, for example, a method for forming projections on the substrate, a method for forming a slit in the display electrode, a method for slightly inclining (pretilting) the liquid crystal molecules by rubbing from the normal direction of the substrate toward one direction within the substrate surface method, and a method for adding a light polymerizable compound to the liquid crystal composition in advance, using it together with a vertical alignment film such as a polyimide, and irradiating the liquid crystal cells with ultraviolet light under application of a voltage, thereby pretilting the liquid crystal, and the like are proposed (for example, see Patent Document 1).

In recent years, a method using anisotropic photochemical reaction by polarized ultraviolet irradiation or others (photoalignment method) is proposed as a replacement of the formation of projections and slits in the regulation of liquid crystal alignment of VA system, and the PSA technique. More specifically, it is known that the inclined direction of the liquid crystal molecules upon application of a voltage can be uniformly regulated by irradiating a vertically aligned polyimide film having photoreactivity with polarized ultraviolet light for imparting alignment regulating property and pretilt angle developing property (see Patent Document 2). This case also uses polyimide liquid crystal alignment films which have high durability and being suitable for the regulation of pretilt angles of liquid crystal as prior art alignment films.

On the other hand, high polarity solvents such as N-methyl-2-pyrrolidone (referred to as NMP) are used as the solvents of liquid crystal alignment processing agents including polyimide polymers because these polyimide polymers have low solvent solubility. These high polarity solvents have high boiling points; for example, the boiling point of NMP is 200° C. or higher. Therefore, when a liquid crystal alignment film is made using a liquid crystal alignment processing agent including NMP as a solvent, baking at a high temperature around 200° C., which is near the boiling point of NMP, is necessary for removing NMP remaining in the liquid crystal alignment film.

On the other hand, when a thin and lightweight plastic substrate having low heat resistance is used as the substrate of a liquid crystal display element, baking in making of a liquid crystal alignment film must be carried at lower temperatures. It is also demanded to reduce the energy cost in the production of liquid crystal display elements by decreasing the baking temperature.

PRIOR ART

Patent Document

Patent Document 1: Japan Patent No. 4504626.
Patent Document 2: Japan Patent No. 4995267.

SUMMARY OF INVENTION

Problems to be Solved by the Invention

The present invention is intended to provide a liquid crystal display element having the above-described properties.

An object of the present invention is to provide a liquid crystal display element which enables baking at low temperatures during the formation of a liquid crystal alignment film by a photoalignment method, the liquid crystal alignment film being able to be imparted with alignment regulating property and pretilt angle developing property.

Further, another object of the present invention is to provide a liquid crystal display element which has high stability of the pretilt angles of liquid crystal, and rarely causes display burn-in even after long-term use.

More, an object of the present invention is to provide a vertical liquid crystal alignment film used in the liquid crystal display element, and a liquid crystal aligning agent which can provide the vertical liquid crystal alignment film.

Means for Solving Problems

The present inventors have found the invention having the following <1> as a summary:

<1> A liquid crystal aligning agent comprising a following component (A), a following component (B) and an organic solvent:

Component (A): a polymer comprising a (A-1) site having an isocyanate group and/or a blocked isocyanate group; and a (A-2) site having photoalignment;

Component (B): a compound having in a molecule of the compound two or more functional groups, each of which is one or more selected from the group consisting of an amino group and a hydroxyl group.

Effects of the Invention

The present invention can provide a liquid crystal aligning agent which enables baking at low temperatures during the formation of a liquid crystal alignment film which can be imparted with alignment regulating property and pretilt angle developing property.

Further, a liquid crystal display element manufactured by the method of the present invention has high stability of the pretilt angles of the liquid crystal, and its display properties will not be impaired even if continuously driven for a long time.

Embodiments for Carrying out the Invention

The present invention will be described in detail hereinafter.

<Component (A): A Polymer Comprising a Site Having an Isocyanate Group and/or a Blocked Isocyanate Group; and a Site Having Photoalignment>

The liquid crystal aligning agent of the present invention comprises a polymer having a (A-1) site having an isocyanate group and/or a blocked isocyanate group, a (A-2) site having photoalignment (hereinafter, may be referred to as "Component (A)" or "Specific polymer").

The "Component (A)", "Specific polymer" can induce a crosslinking reaction or isomerization reaction by exposing to light.

<<(A-1) Site Having an Isocyanate Group and/or a Blocked Isocyanate Group>>

The (A-1) site having an isocyanate group and/or a blocked isocyanate group of the present invention may be preferably represented by the following formula (1).

Further, the site may be a derived from a monomer represented by following formula (1m).

(1)

(1m)

In the formula (1) or (1m), Sa represents a spacer unit, the bonding pointer left of Sa represents bonding to the backbone of the specific polymer optionally via a spacer, and Ia represents an isocyanate group or a blocked isocyanate group.

Further, in the formula (1m), Ma represents a first polymerizable group. Examples of the first polymerizable group may include radical polymerizable groups of (meth)acrylate, fumarate, maleate, α-methylene-γ-butyrolactone, styrene, vinyl, maleimide, norbornene, (meth)acrylamide, and derivatives thereof, and siloxane. Preferably, the first polymerizable group may be (meth)acrylate, α-methylene-γ-butyrolactone, styrene, vinyl, maleimide, or acrylamide.

In the formula (1m), c is an integer of 1 to 3, preferably 1 or 2.

Mb is a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic group, a divalent alicyclic group, a trivalent alicyclic group, a tetravalent alicyclic group, a divalent condensed cyclic group, a trivalent condensed cyclic group or a tetravalent condensed cyclic group. Each group may be unsubstituted, or one or more hydrogen atoms in each group may be substituted with a fluorine atom, a chlorine atom, a cyano group, a methyl group, or a methoxy group.

Sa may be derived from the following formula (2).

(2)

The bond left of $W_1$ represents a bond to Mb, the bond right of $W_3$ represents a bond to Ia, $W_1$, $W_2$, and $W_3$ each independently represents a single bond, a divalent heterocycle, —$(CH_2)_n$— (wherein n represents 1 to 20), —$OCH_2$—, —$CH_2O$—, —COO—, —OCO—, —CH=CH—, —CF=CF—, —$CF_2O$—, —$OCF_2$—, —$CF_2CF_2$— or —C≡C—, wherein in these substituents, one or more non-adjacent $CH_2$ groups may be independently substituted with —O—, —CO—, —CO—O—, —O—CO—, —Si($CH_3$)$_2$—O—Si($CH_3$)$_2$—, —NR—, —NR—CO—, —CO—NR—, —NR—CO—O—, —OCO—NR—, —NR—CO—NR—, —CH=CH—, —C≡C— or —O—CO—O— (wherein R independently represents hydrogen or a linear or branched alkyl group having a carbon atom number of 1 to 5), $A_1$ and $A_2$ each independently represents a divalent aromatic group, a divalent alicyclic group, a divalent heterocyclic group or a divalent condensed cyclic group, wherein each group may be unsubstituted, or one or more hydrogen atoms in each group may be substituted with a fluorine atom, a chlorine atom, a cyano group, a methyl group, or a methoxy group.

Ia represents an isocyanate group or a blocked isocyanate group as described above.

The "blocked isocyanate group" means an isocyanate group whose isocyanate group (—NCO) is blocked by an appropriate protective group (BL), which can be represented by, for example, the following formula (5).

In the liquid crystal aligning agent of the present invention, in the blocked isocyanate group, the protective group (blocked site) is detached by thermal dissociation during formation of a liquid crystal alignment film under heating and firing, whereby a reactive isocyanate group is formed. The isocyanate group thus formed causes crosslinking reaction with other side chain of a polymer which will form the liquid crystal alignment film. Additionally, the isocyanate group reacts with a compound having in a molecule of the compound two or more functional groups, each of which is one or more selected from the group consisting of an amino group and a hydroxyl group.

(5)

The blocked isocyanate group can be obtained by acting an appropriate blocking agent on the compound having an isocyanate group.

Examples of the blocking agent may include alcohols such as methanol, ethanol, isopropanol, n-butanol, 1-methoxy-2-propanol, 2-ethoxyhexanol, 2-N,N-dimethylaminoethanol, 2-ethoxyethanol, and cyclohexanol; phenols such as phenol, o-nitrophenol, p-chlorophenol, o-, m-, or p-cresol; lactams such as ε-caprolactam; oximes such as acetone oxime, methyl ethyl ketone oxime, methyl isobutyl ketone oxime, cyclohexanone oxime, acetophenone oxime, and benzophenone oxime; pyrazoles such as pyrazole, 3,5-dimethylpyrazole, and 3-methylpyrazole; thiols such as dodecanethiol and benzenethiol; and carboxylates such as diethyl malonate. The blocking agent may preferably be ethanol, isopropanol, 1-methoxy-2-propanol, 3,5-dimethylpyrazole, γ-caprolactam or methyl ethyl ketone oxime.

Preferred examples of the specific structure of BL may include, but are not limited to, the following BL-1 to BL-7. The bonding pointer expressed by a broken line represents the coupling part with the carbon of the formula (5).

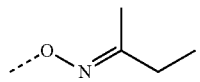

BL-1

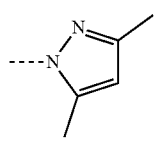

BL-2

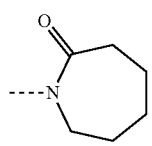

BL-3

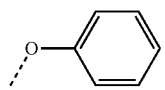

BL-4

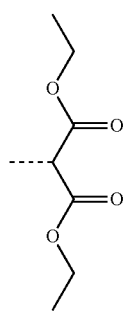

BL-5

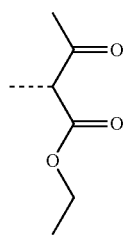

BL-6

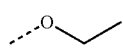

BL-7

Examples of Ia may include, but are not limited to, the following Ia-1 to Ia-8. In the formulae, the broken line represents bonding to Sa in the formula (1), $R_6$ represents a linear or branched alkyl group having a carbon number of 1 to 10 (wherein one or more non-adjacent $CH_2$ groups may be independently substituted with an oxygen atom).

----NCO

Ia-1

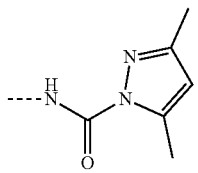

Ia-2

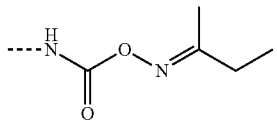

Ia-3

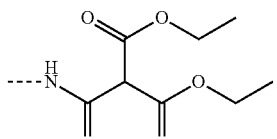

Ia-4

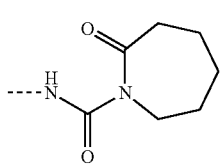

Ia-5

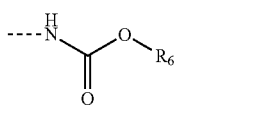

Ia-6

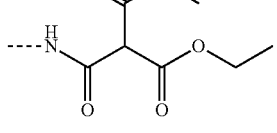

Ia-7

Ia-8

When an isocyanate group, i.e., an unblocked isocyanate group is contained as a component of the specific polymer, the isocyanate group exhibits good reactivity to a compound having in a molecule of the compound two or more functional groups, each of which is one or more selected from the group consisting of an amino group and a hydroxyl group, so that it allows efficient crosslinking reaction even in baking at low temperatures.

The reaction temperature between an isocyanate group and an amino group or a hydroxyl group may be 50° C. to 200° C., preferably 80° C. to 200° C., and more preferably 80° C. to 180° C.

The isocyanate group has good reactivity to an amino group or a hydroxyl group, particularly an amino group; its crosslinking reaction may proceed even at low temperatures, and storage stability of the liquid crystal aligning agent may deteriorate. Therefore, when the liquid crystal aligning agent is stored for a long period, a blocked isocyanate group may be used.

Some blocked isocyanate site may cause crosslinking reaction through the isocyanate group because of thermal dissociation of the blocked site at high temperatures such as the temperature of heating baking during formation of a liquid crystal alignment film. It is preferable that the isocyanate group will not cause crosslinking at low temperatures for storing the liquid crystal aligning agent. In order to achieve such thermal reactivity, a blocked isocyanate compound may preferably have a considerably higher heat dissociative temperature in the blocked site than the storage temperature of the liquid crystal aligning agent, for example, preferably 50° C. to 230° C., more preferably 60° C. to 150° C.

The (A-1) site having an isocyanate group and/or a blocked isocyanate group may be derived from a monomer represented by the above-described formula (1m), as described above. Examples of the monomer represented by the formula (1m) may include, but are not limited to, the followings.

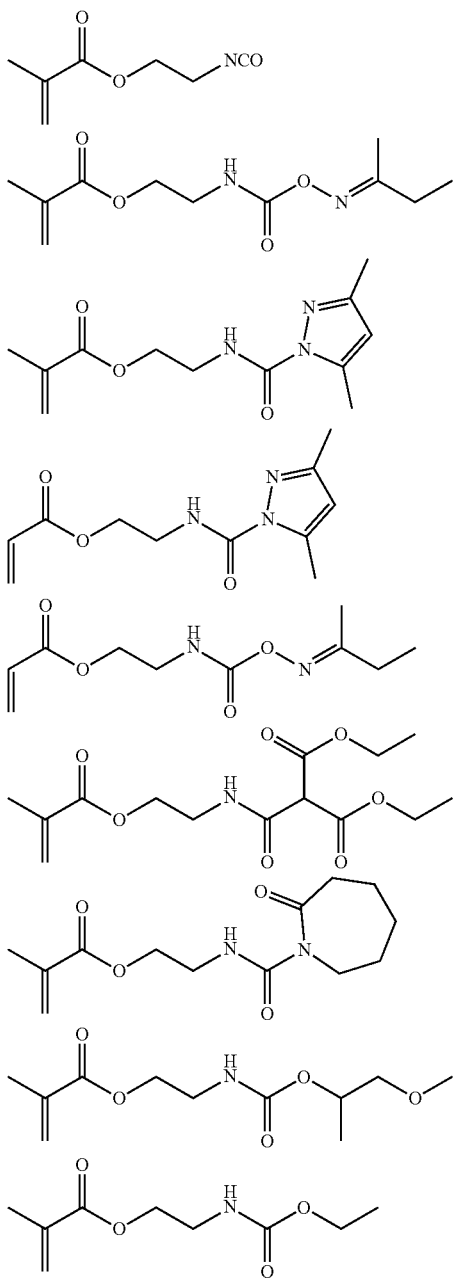

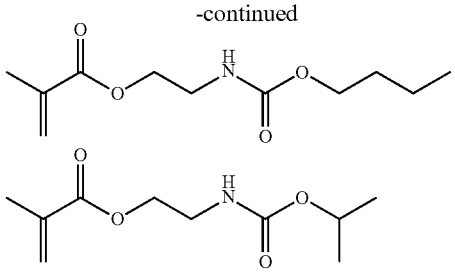

<<(A-2) Site Having Photoalignment>>

The component (A), the specific polymer comprises a (A-2) site having photoalignment.

The structure of the site having photoalignment is not particularly limited, but preferably has a cinnamic acid structure. In this case, the vertical alignment regulating property thus achieved is maintained stable for a long period, even under external stress such as heat. Additionally, it has high sensitivity to light, so that it can develop alignment regulating property even under polarized ultraviolet irradiation at a low exposure dose.

The site having photoalignment of the present invention may be preferably represented by the following formula (3).

Additionally, the site may be derived from a monomer represented by following formula (3m).

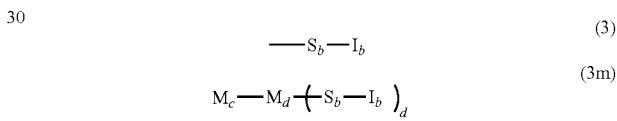

In the formula (3) or (3m), Ib is a monovalent organic group having a photoreactive group having photoalignment.

Sb represents a spacer unit, the bonding pointer left of Sb represents bonding to the backbone of the specific polymer optionally via a spacer.

Sb is preferably a linear or branched alkylene group having a carbon number of 1 to 10, a divalent aromatic group, or a divalent alicyclic group.

Additionally, in the formula (3m), Mc represents a second polymerizable group. Examples of the second polymerizable group may include radical polymerizable groups of (meth) acrylate, fumarate, maleate, α-methylene-γ-butyrolactone, styrene, vinyl, maleimide, norbornene, (meth)acrylamide, and derivatives thereof, and siloxane, which are similar to the above-described first polymerizable group. The second polymerizable group may be (meth)acrylate, α-methylene-γ-butyrolactone, styrene, vinyl, maleimide, or acrylamide.

The d is an integer of 1 to 3, and preferably 1 or 2.

Md is a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, a tetravalent alicyclic group, a divalent condensed cyclic group, a trivalent condensed cyclic group, or a tetravalent condensed cyclic group. Each group may be unsubstituted, or one or more hydrogen atoms in each group may be substituted with a fluorine atom, a chlorine atom, a cyano group, a methyl group, or a methoxy group.

Sb may be represented by the above-described formula (2), independent from the above-described Sa.

In the present invention, the photoreactive group having photoalignment means a group which causes photoisomerization or photodimerization by stimulation with ultraviolet light. The photoreactive group may have, for example, the group represented by any of the following formulae (III)-1 to (III)-4, but is not limited thereto.

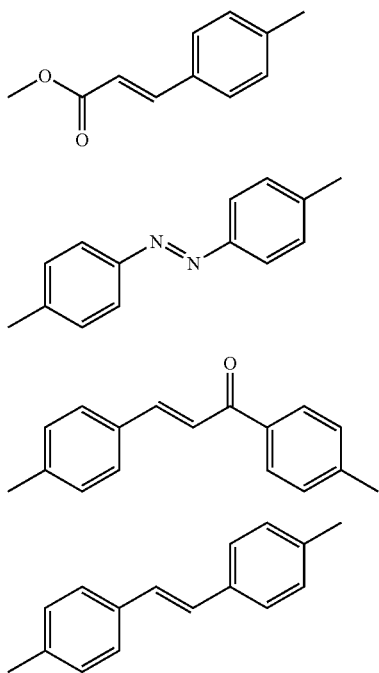

(III)-1

(III)-2

(III)-3

(III)-4

Preferred structures of the site having photoalignment, which can develop good vertical alignment regulating property and stable pretilt angle, may include, but are not limited to, the structure of the following formula (3m)-1 having the group represented by the (III)-1.

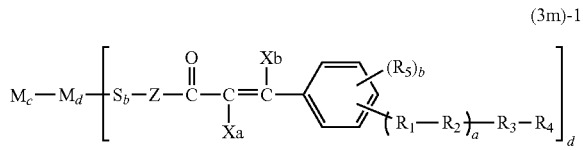

(3m)-1

In the formula (3m)-1, Mc, Md, Sb and d each has the same definition as described above.

Z is an oxygen atom or a sulfur atom.

Xa and Xb each independently represents a hydrogen atom, a fluorine atom, a chlorine atom, a cyano group or an alkyl group having a carbon number of 1 to 3.

$R_1$ is a single bond, an oxygen atom, —COO— or —OCO—, preferably a single bond, —COO— or —OCO—.

$R_2$ is a divalent aromatic group, a divalent alicyclic group, a divalent heterocyclic group or a divalent condensed cyclic group.

$R_3$ is a single bond, an oxygen atom, —COO— or —OCO—.

$R_4$ is a monovalent organic group having a carbon number of 3 to 40 containing a linear or branched alkyl group or alicyclic group having a carbon number of 1 to 40.

$R_5$ is an alkyl group having a carbon number of 1 to 3, an alkoxy group having a carbon number of 1 to 3, a fluorine atom or a cyano group, preferably a methyl group, a methoxy group or a fluorine atom.

The symbol a is an integer of 0 to 3, and b is an integer of 0 to 4.

The linear or branched alkylene group having a carbon number of 1 to 10 of Sb may be a linear or branched alkylene group having a carbon number of 1 to 8. Preferably the alkylene group may preferably be a methylene group, an ethylene group, an n-propylene group, an n-butylene group, a t-butylene group, an n-pentylene group, an n-hexylene group, an n-heptylene group, and an n-octylene group.

Examples of the divalent aromatic group of Sb may include a 1,4-phenylene group, a 2-fluoro-1,4-phenylene group, a 3-fluoro-1,4-phenylene group, and a 2,3,5,6-tetrafluoro-1,4-phenylene group.

Examples of the divalent alicyclic group of Sb may include trans-1,4-cyclohexylene, and trans-trans-1,4-bicyclohexylene.

Examples of the divalent heterocyclic group of Sb may include a 1,4-pyridylene group, a 2,5-pyridylene group, a 1,4-furanylene group, a 1,4-piperazine group, and a 1,4-piperidine group.

Examples of the divalent condensed cyclic group of Sb may include a naphthylene group.

Sb may preferably be an alkylene group having a carbon number of 1 to 8, more preferably an alkylene group having a carbon number of 1 to 6, even more preferably an alkylene group having a carbon number of 1 to 4.

Examples of the divalent aromatic group of $R_2$ may include a 1,4-phenylene group, a 2-fluoro-1,4-phenylene group, a 3-fluoro-1,4-phenylene group, and a 2,3,5,6-tetrafluoro-1,4-phenylene group.

Examples of the divalent alicyclic group of $R_2$ may include trans-1,4-cyclohexylene and trans-trans-1,4-bicyclohexylene.

Examples of the divalent heterocyclic group of $R_2$ may include a 1,4-pyridylene group, a 2,5-pyridylene group, a 1,4-furanylene group, a 1,4-piperazine group, and a 1,4-piperidine group.

Examples of the divalent condensed cyclic group of $R_2$ may include a naphthylene group.

$R_2$ may be a 1,4-phenylene group, trans-1,4-cyclohexylene, or trans-trans-1,4-bicyclohexylene.

Preferred examples of the linear or branched alkyl group of $R_4$ having a carbon number of 1 to 40 may include a linear or branched alkyl group having a carbon number of 1 to 20, wherein some or all of the hydrogen atoms of the alkyl group may be substituted with fluorine atoms. Examples of the alkyl group may include a methyl group, an ethyl group, an n-propyl group, an n-butyl group, a t-butyl group, an n-pentyl group, an n-hexyl group, an n-heptyl group, an n-octyl group, an n-nonyl group, an n-decyl group, an n-lauryl group, an n-dodecyl group, an n-tridecyl group, an n-tetradecyl group, an n-pentadecyl group, an n-hexadecyl group, an n-heptadecyl group, an n-octadecyl group, an n-nonadecyl group, an n-eicosyl group, a 4,4,4-trifluorobutyl group, a 4,4,5,5,5-pentafluoropentyl group, a 4,4,5,5,6,6,6-heptafluorohexyl group, a 3,3,4,4,5,5,5-heptafluoropentyl group, a 2,2,2-trifluoroethyl group, a 2,2,3,3,3-pentafluoropropyl group, a 2-(perfluorobutyl)ethyl group, a 2-(perfluorooctyl)ethyl group, and a 2-(perfluorodecyl)ethyl group.

Examples of the monovalent organic group including an alicyclic group and having a carbon number of 3 to 40 of $R_4$ may include a cholesteryl group, a cholestanyl group, an adamantyl group, and the groups represented by the following formula (A-1) or (A-2), wherein $R_7$ is independently a hydrogen atom, a fluorine atom, or an alkyl group having a carbon number of 1 to 20 which may be substituted with a fluorine atom.

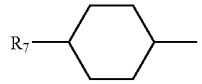

(A-1)

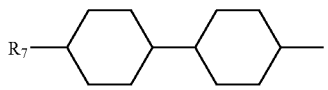

(A-2)

The (A-2) site having photoalignment may be derived from the monomer represented by the formula (3m) or (3m)-1, as described above. Examples of the monomer represented by the formula (3m) or (3m)-1 may include, but are not limited to, the followings.

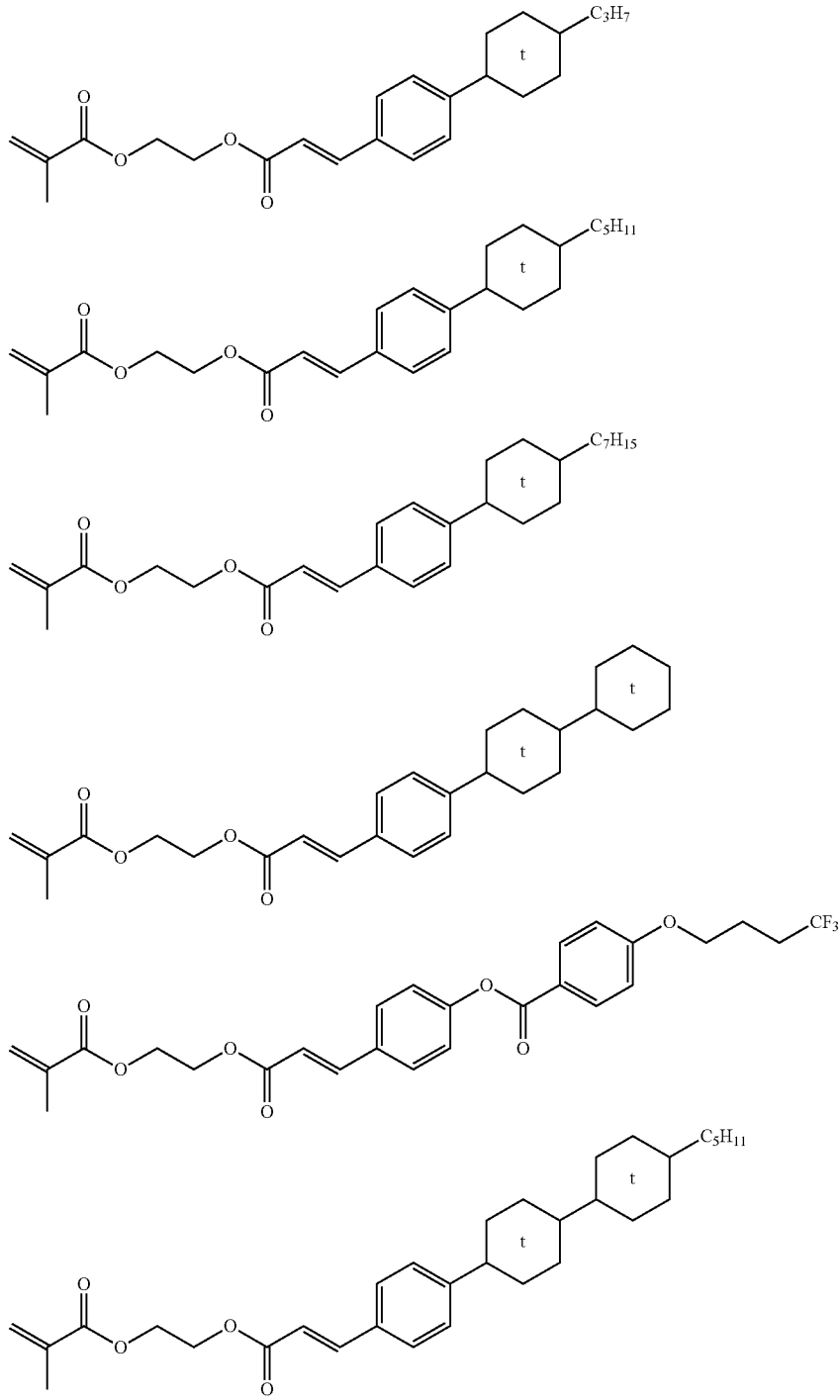

-continued
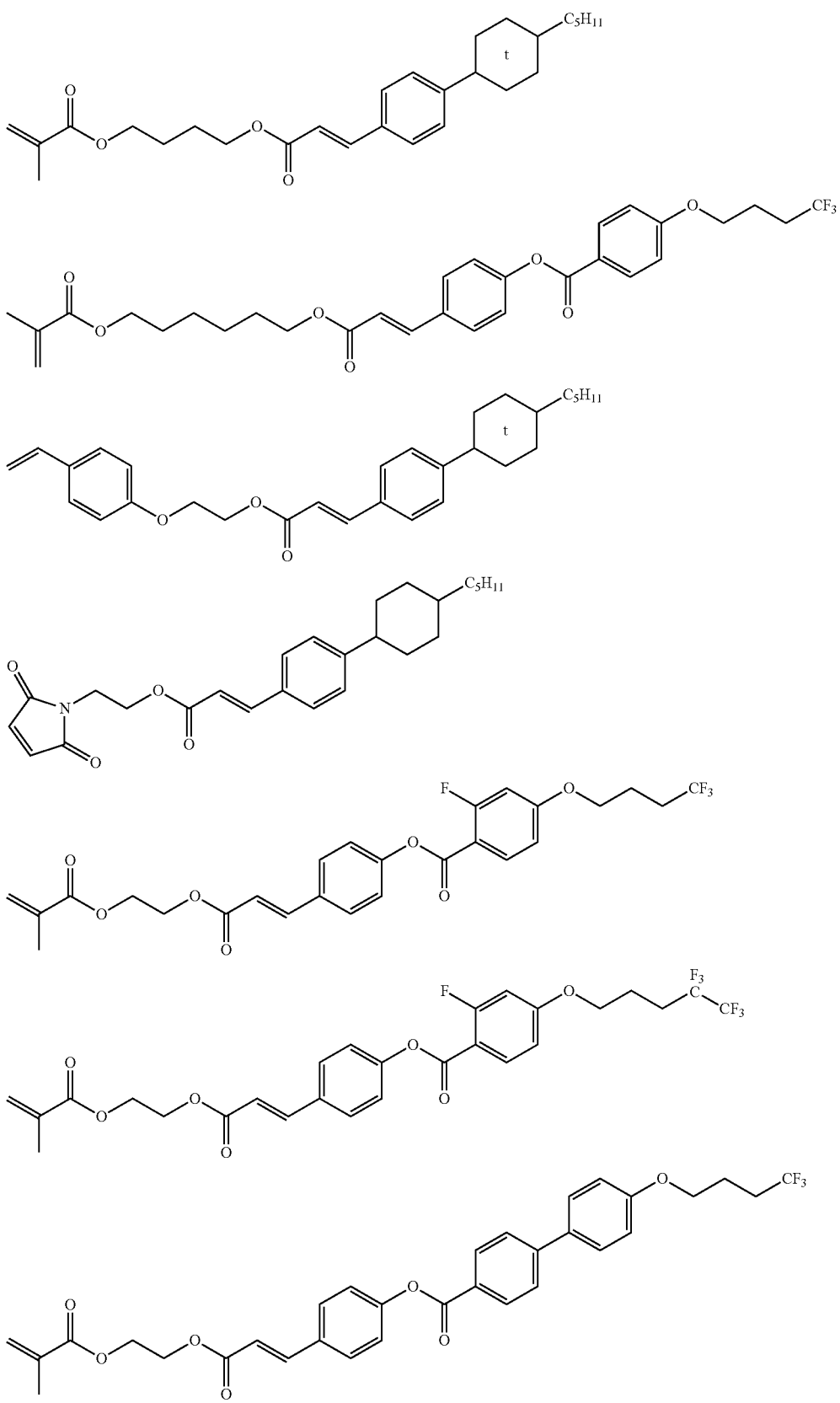

-continued

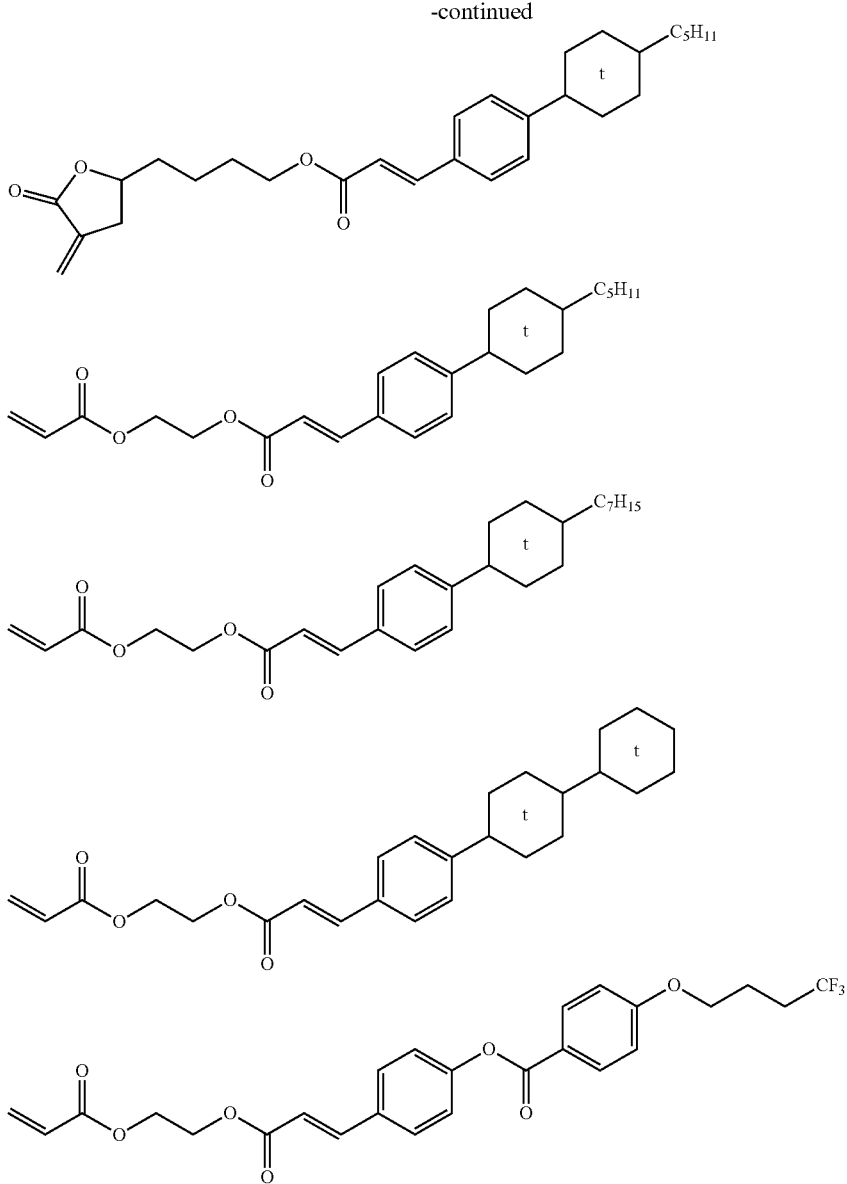

The (A-1) isocyanate group or the blocked isocyanate group in the component (A), i.e., the specific polymer reacts with a compound having in a molecule of the compound two or more functional groups, each of which is one or more selected from the group consisting of an amino group and a hydroxyl group, to obtain a liquid crystal alignment film having high film hardness and stability. Further, the liquid crystal alignment film cured by crosslinking reaction stabilizes the alignment regulating property and pretilt angles of the liquid crystal induced by subsequent irradiation with polarized ultraviolet light.

An amount of the (A-1) site having the isocyanate group or the blocked isocyanate group may be 5 to 90 mol %, preferably 10 to 90 mol %, more preferably 20 to 80 mol % of the component (A), the specific polymer.

An amount of the (A-2) site having photoalignment may be 10 to 95 mol %, preferably 10 to 90 mol %, more preferably 20 to 70 mol % of the component (A), the specific polymer.

<Component (B): Compound Having in a Molecule of the Compound Two or More Functional Groups, Each of which is One or More Selected from the Group Consisting of an Amino Group and a Hydroxyl Group>

The liquid crystal aligning agent of the present invention comprises a compound having in a molecule of the compound two or more functional groups, each of which is one or more selected from the group consisting of an amino group and a hydroxyl group.

All of the two or more functional groups may be the same (one) type of amino group or hydroxyl group, or two or more amino group or hydroxyl group. The amino group and hydroxyl group may be mixed.

The component (B) of the present invention may be a polymer having repeating units as long as it has in a molecule thereof two or more functional groups, each of which is one or more selected from the group consisting of an amino group and a hydroxyl group.

For example, the polymer having repeating units may have two or more of one or more types of functional group selected from the group consisting of an amino group and a hydroxyl group at its ends.

Further, for example, the polymer corresponds to the component (B) of the present invention as long as the polymer has two or more functional groups, even if it is a polymer derived from a monomer having one functional group. More specifically, 2-hydroxyethyl methacrylate (HEMA) is a compound having only one hydroxyl group, and does not correspond to the component (B) of the present invention. However, the polymer obtained by polymerizing the HEMA has two or more hydroxyl groups, so that it corresponds to the component (B) of the present invention.

More, for example, the component (B) of the present invention may be a polymer having repeating units derived from a monomer having two or more functional groups (wherein the functional groups is an amino group and/or a hydroxyl group).

The component (B) (hereinafter, referred to as a specific compound) can cause crosslinking reaction with the polymer as the above-described component (A), in particular, with the isocyanate group (including the isocyanate group formed by dissociation of a block group from a blocked isocyanate group) in the component (A). As a result of the reaction, as described above, a liquid crystal alignment film having high film hardness and stability is obtained. Further, curing of the liquid crystal alignment film by crosslinking reaction stabilizes the alignment regulating property and pretilt angles of the liquid crystal induced by subsequent irradiation with polarized ultraviolet light.

In the liquid crystal aligning agent of the present invention, when the component (B) is the above-described polymer having repeating units and a number average molecular weight of 2000 or less, or a compound having no repeating unit, the proportion of the component (B) may be 1 to 80% by mass, preferably 1 to 50% by mass, and more preferably 2 to 30% by mass with reference to 100% by mass of the component (A). In other words, the component (A):component (B) may be 100:1 to 100:80, preferably 100:1 to 100:50, and more preferably 100:2 to 100:30, in terms of the mass ratio.

Further, when the component (B) is a polymer having repeated units and a number average molecular weight of 2000 or more, the proportion of the component (B) may be 5 to 1000% by mass, preferably 5 to 900% by mass, and more preferably 10 to 800% by mass with reference to 100% by mass of the component (A). In other words, the component (A):component (B) may be 100:5 to 100:1000, preferably 100:5 to 100:900, and more preferably 100:10 to 100:800 in terms of the mass ratio.

The compound of the component (B) of the present invention is represented by the following formula (4), wherein T represents an amino group or a hydroxyl group, Y represents an organic group with a valence m, and m is an integer of 2 or more.

In the formula, m is 2 or more, and m is preferably a large number for promoting the crosslinking reaction with a specific polymer.

$$(T)_m Y \qquad (4)$$

The compound having two or more amino groups in a molecule thereof may be a common diamine compound or triamine compound, tetraamine compound, or polyamine compound.

Specific examples of Y in a case where m being 2 may include, but are not limited to, the following formulae (Y-1) to (Y-120).

Among them, when a liquid crystal alignment film for increasing the pretilt angles of liquid crystal is made, Y is preferably a structure prepared from a diamine compound having a long-chain alkyl group (for example, an alkyl group having a carbon number of 10 or more), an aromatic ring, an aliphatic ring, a steroid skeleton, or a combination of them Examples of the Y may include, but are not limited to, (Y-84), (Y-85), (Y-86), (Y-87), (Y-88), (Y-89), (Y-90), (Y-91), (Y-92), (Y-93), (Y-94), (Y-95), (Y-96), (Y-97), (Y-98), (Y-99), (Y-100), (Y-101), (Y-102), (Y-103), (Y-104), (Y-105), (Y-106), (Y-107), or (Y-108).

Further, for improving the electrical properties of the liquid crystal display element, for example, (Y-31), (Y-40), (Y-64), (Y-65), (Y-66), (Y-67), (Y-109), and (Y-110) are preferred.

More, although the specific polymer comprises a photoreactive site, (Y-17), (Y-18), (Y-111), (Y-112), (Y-113), (Y-114), (Y-115), (Y-116), (Y-117), (Y-118), or (Y-119) may be used in combination with the specific polymer comprising the photoreactive site.

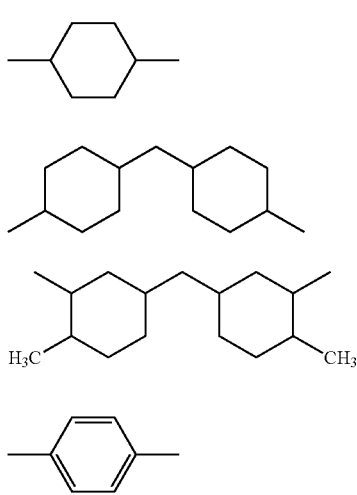

-continued
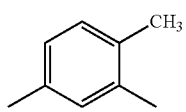 (Y-7)
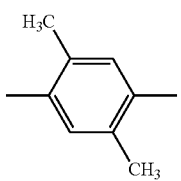 (Y-9)
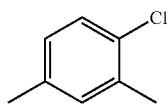 (Y-8)
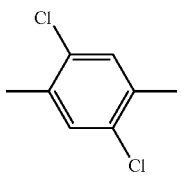 (Y-10)
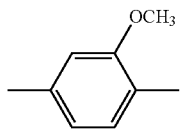 (Y-11)
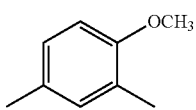 (Y-12)
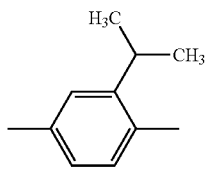 (Y-13)
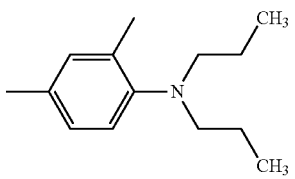 (Y-14)
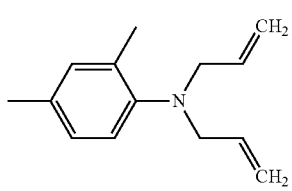 (Y-15)
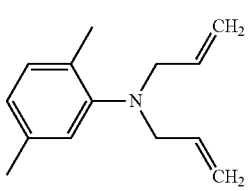 (Y-16)
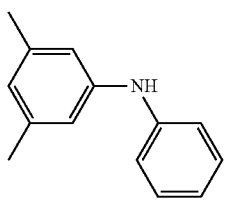 (Y-17)
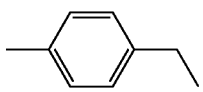 (Y-18)
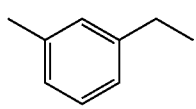 (Y-19)
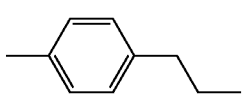 (Y-20)
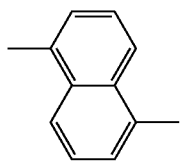 (Y-21)
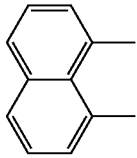 (Y-22)
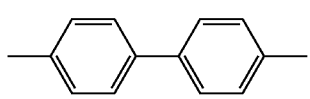 (Y-23)
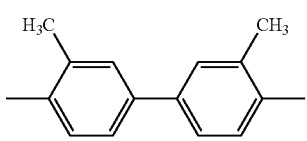 (Y-24)

(Y-27)
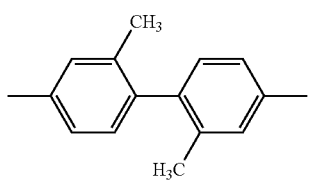
(Y-28)
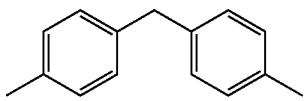
(Y-29)
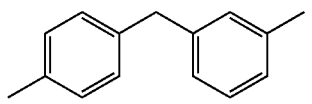
(Y-30)
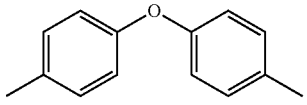
(Y-31)
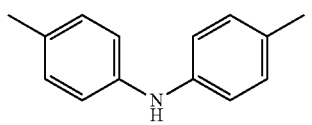
(Y-32)
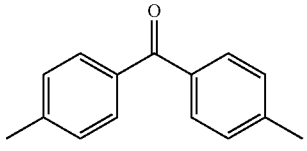
(Y-33)
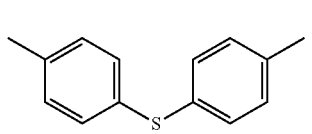
(Y-34)
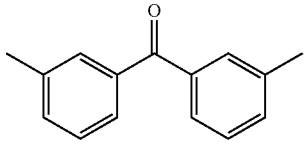
(Y-35)
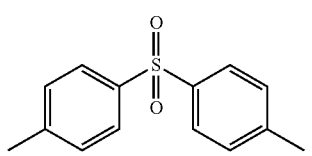
(Y-36)
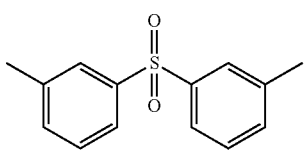
(Y-37)
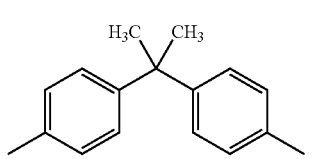
(Y-38)
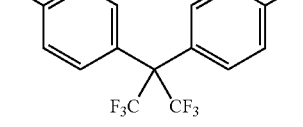
(Y-39)
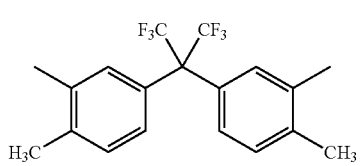
(Y-40)
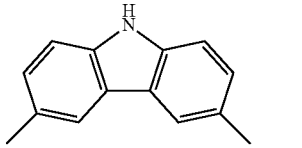
(Y-41)
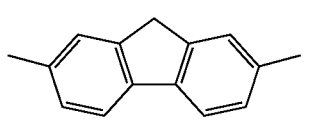
(Y-42)
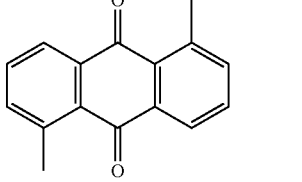
(Y-43)
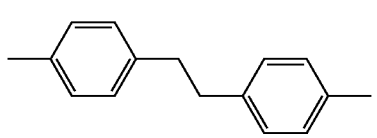
(Y-44)
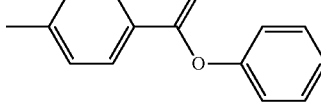
(Y-45)
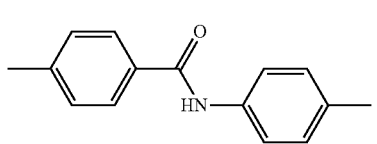
(Y-46)
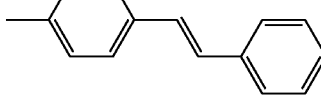

(Y-47)
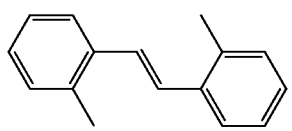
(Y-48)
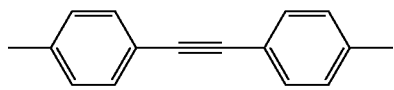
(Y-49)
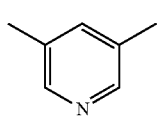
(Y-50)
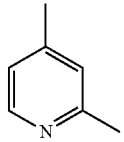
(Y-51)
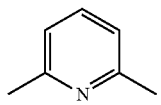
(Y-52)
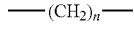
n = 2~5
(Y-53)
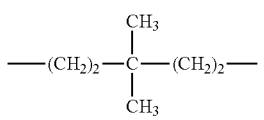
(Y-54)
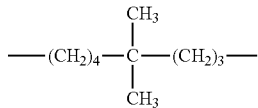
(Y-55)
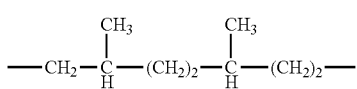
(Y-56)
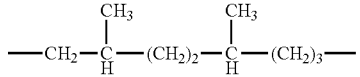
(Y-57)
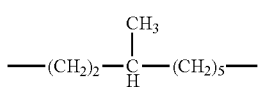
(Y-58)
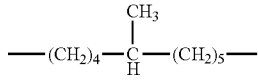
(Y-59)
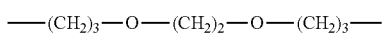
(Y-60)
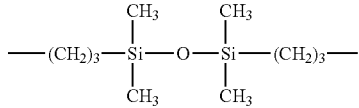
(Y-61)
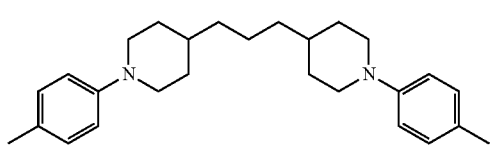
(Y-62)
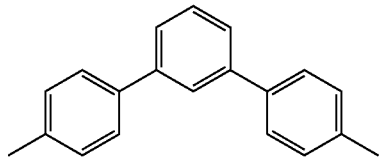
(Y-63)
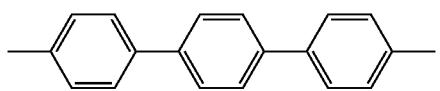
(Y-64)
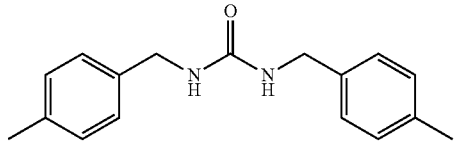
(Y-65)
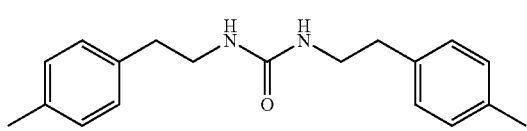
(Y-66)
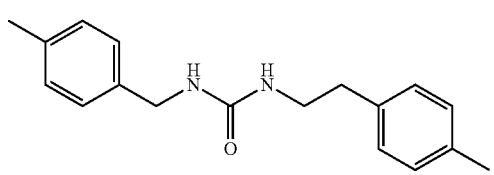
(Y-67)
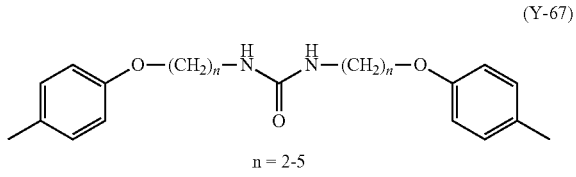
n = 2-5
(Y-68)
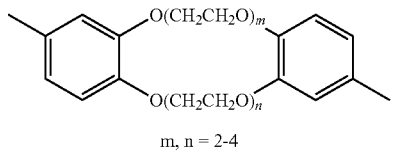
m, n = 2-4

-continued
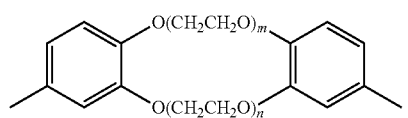
(Y-69)
m, n = 2-4
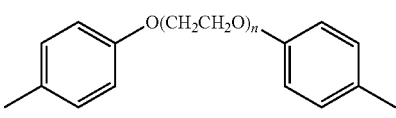
(Y-70)
n = 2-4
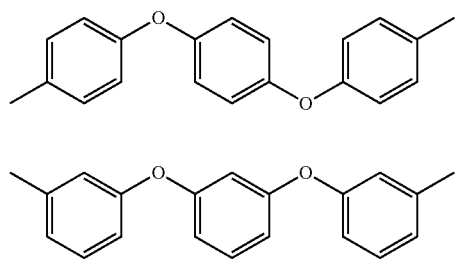
(Y-71)
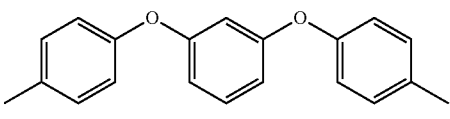
(Y-72)
(Y-73)
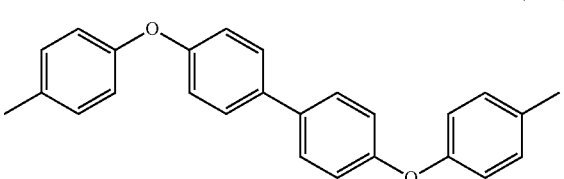
(Y-74)
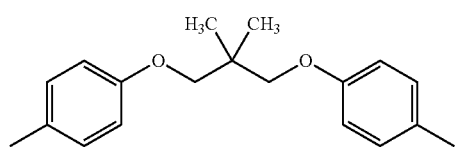
(Y-75)
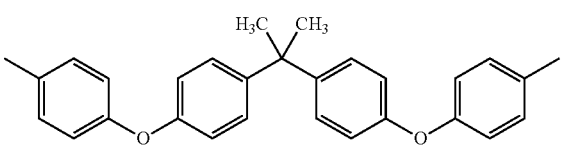
(Y-76)
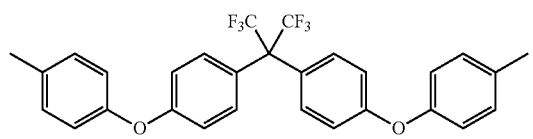
(Y-77)
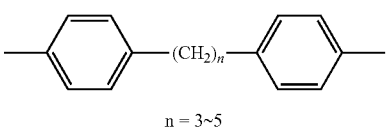
(Y-78)
n = 3~5
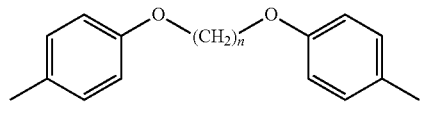
(Y-79)
n = 2~5
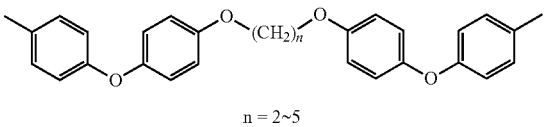
(Y-80)
n = 2~5
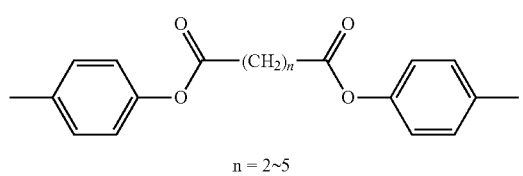
(Y-81)
n = 2~5
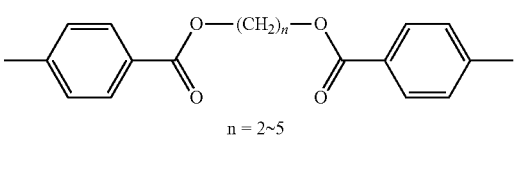
(Y-82)
n = 2~5
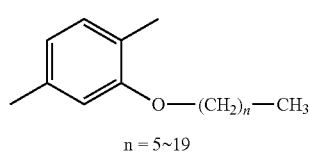
(Y-84)
n = 5~19
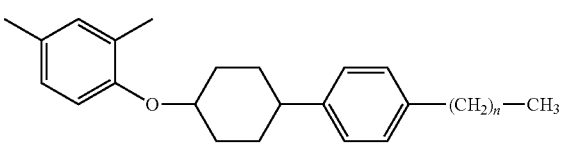
(Y-85)
n = 0~21
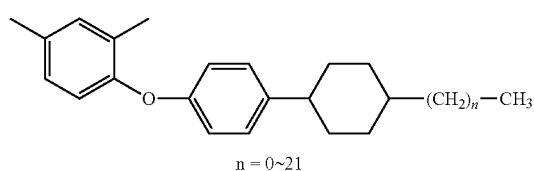
(Y-86)
n = 0~21
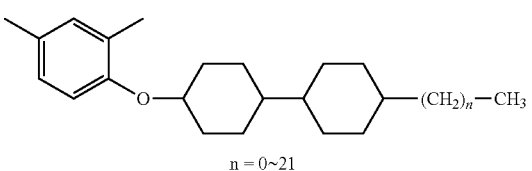
(Y-87)
n = 0~21

-continued
(Y-88)
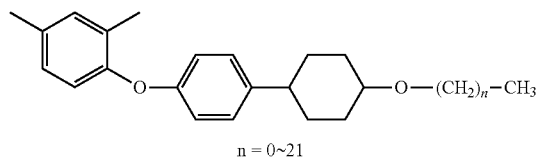
n = 0~21
(Y-89)
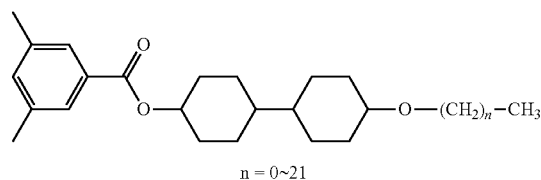
n = 0~21
(Y-90)
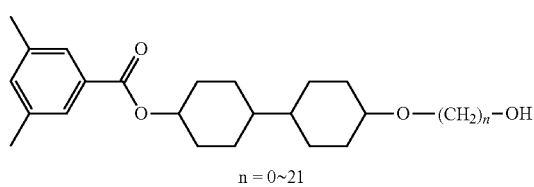
n = 0~21
(Y-91)
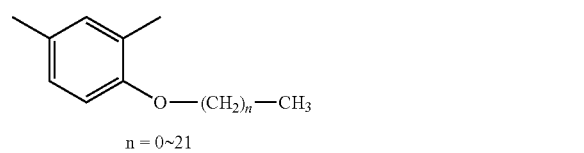
n = 0~21
(Y-92)
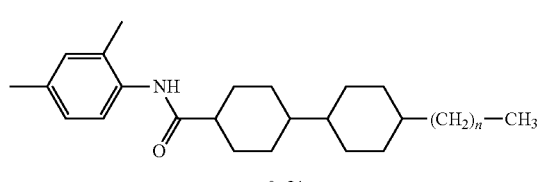
n = 0~21
(Y-93)
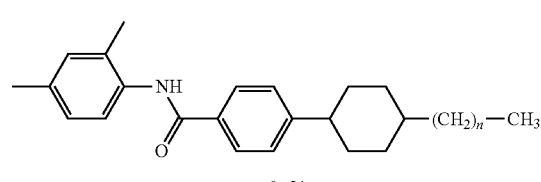
n = 0~21
(Y-94)
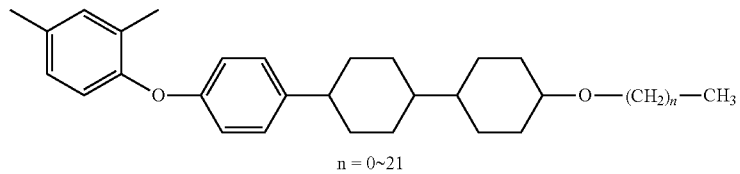
n = 0~21
(Y-95)
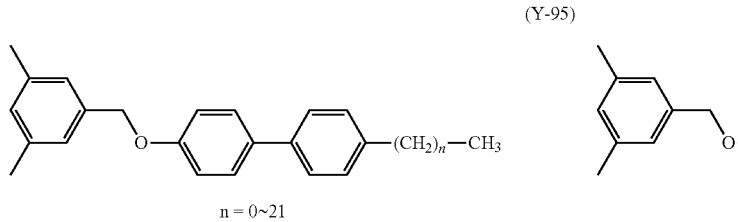
n = 0~21
(Y-96)
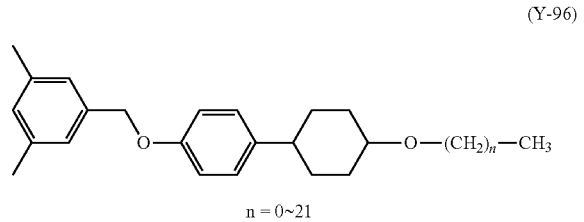
n = 0~21
(Y-97)
n = 0~21
(Y-98)
n = 0~21
(Y-99)
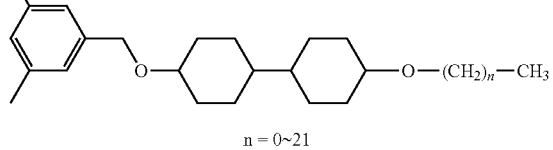
(Y-100)
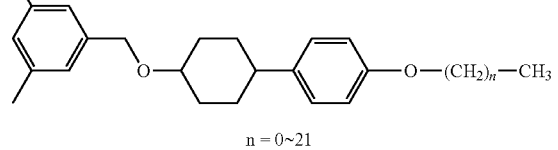

-continued
(Y-101)
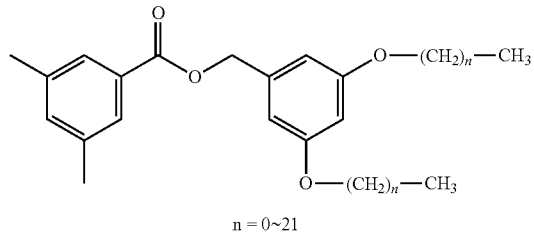
n = 0~21
(Y-102)
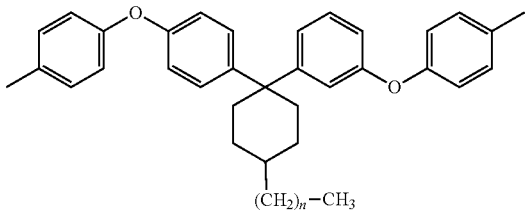
n = 0~21
(Y-103)
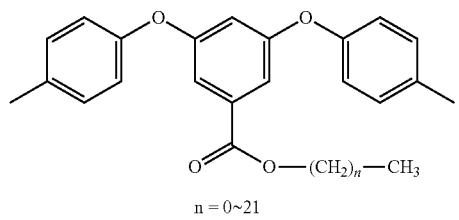
n = 0~21
(Y-104)
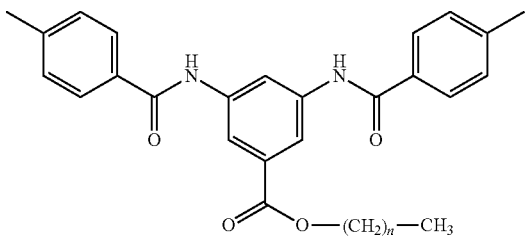
n = 0~21
(Y-105)
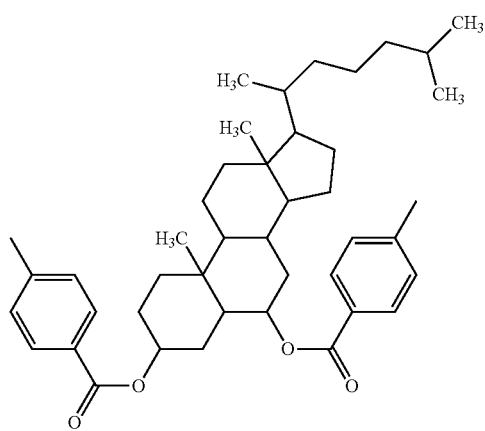
(Y-106)
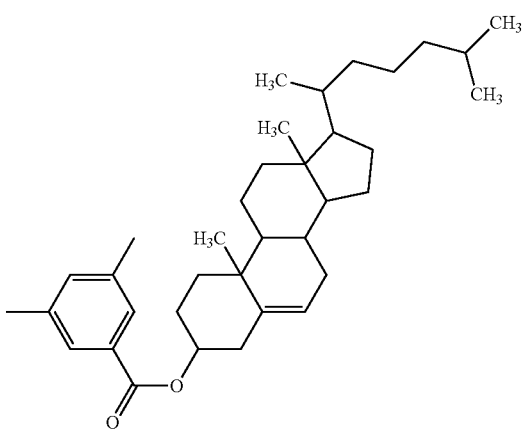
(Y-107)
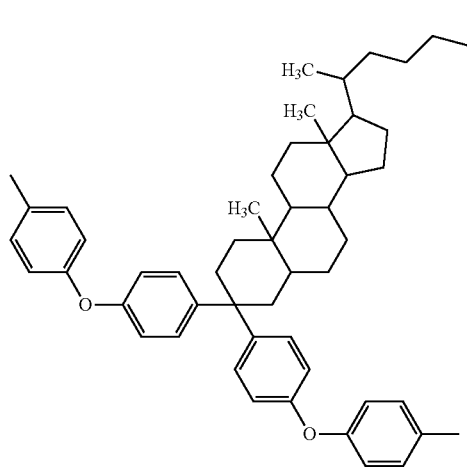
(Y-108)
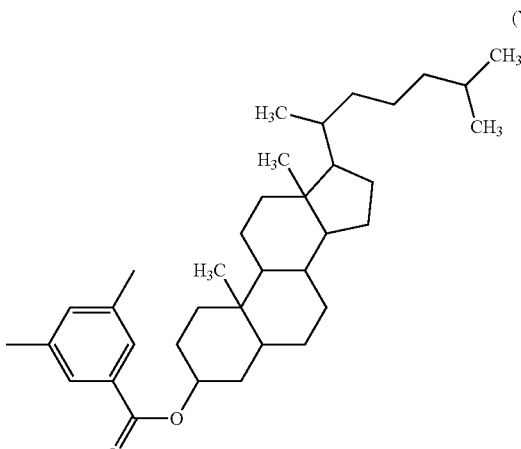

-continued
(Y-109) 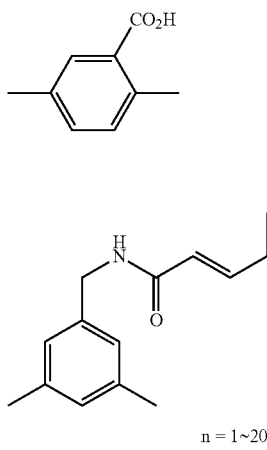 (Y-110)
(Y-111) (Y-112)
(Y-113) (Y-114)
(Y-115) (Y-116)
(Y-117) (Y-118)
(Y-119) (Y-120)

Additionally, in the compound represented by the above-described formula, specific examples of Y in a case of m being 3 or more may include, but are not limited to, the trivalent or more organic group represented by the following formula, and the structure from which the hydrogen atoms in the (Y-1) to (Y-120) are detached. In the present description, Me is a methyl group.

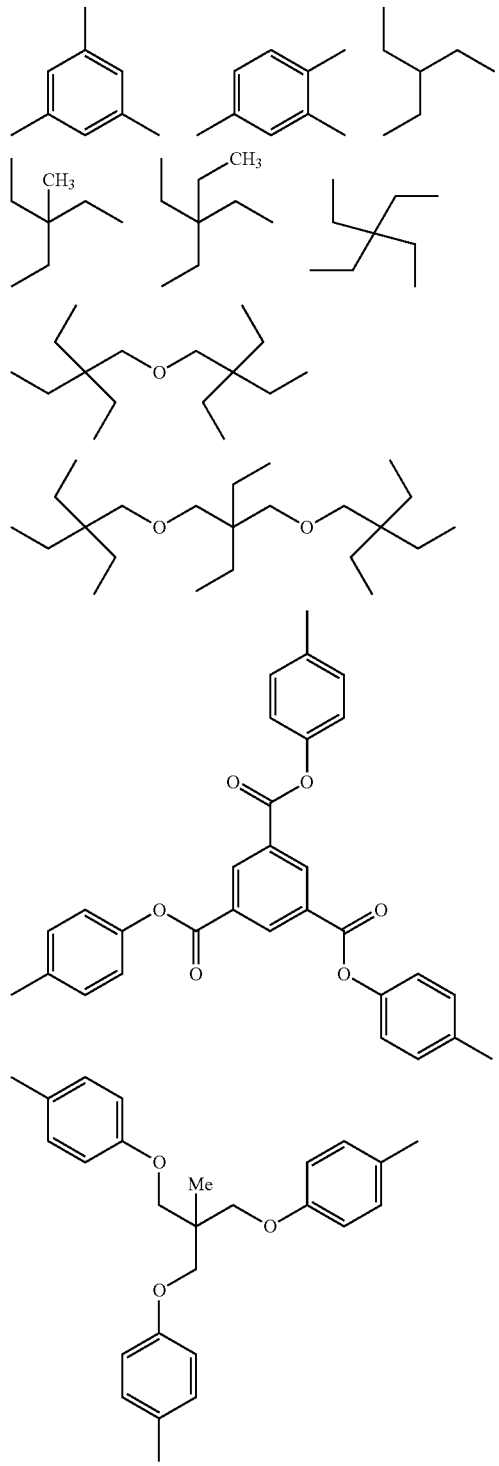
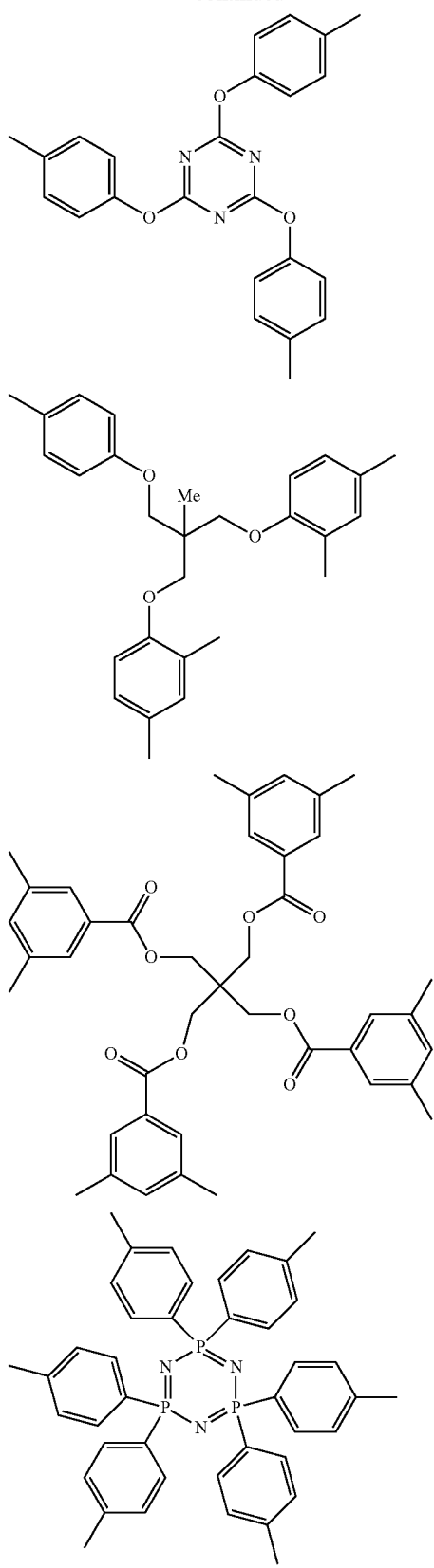

The compound having two or more hydroxyl groups in a molecule thereof may be a common diol compound, a triol compound, a tetraol compound, a polyol compound, or a polymer having a plurality of hydroxyl groups in each molecule.

Specific examples in a case of m being 2 may include, but are not limited to, 1,4-butanediol, 1,5-pentanediol, 1,6-hexanediol, 1,7-heptanediol, 1,8-octanediol, 1,9-nonanediol, 1,10-decanediol, 1,11-dodecanediol, the divalent or higher multivalent organic groups represented by the following formulae (6) to (8), and the structures wherein Y is (Y-1) to (Y-120).

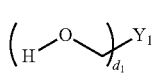

(6)

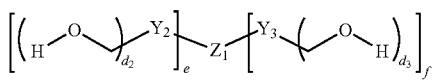

(7)

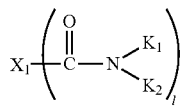

(8)

$Y_1$, $Y_2$, and $Y_3$ each independently represents an aromatic ring. Any hydrogen atom in the aromatic ring may be substituted with a hydroxyl group, an alkyl group having a carbon atom number of 1 to 3, a halogen atom, an alkoxy group having a carbon atom number of 1 to 3, or a vinyl group.

$Z_1$ is a single bond, a divalent saturated hydrocarbon group having a carbon number of 1 to 10 which may be entirely or partially bonded to form a cyclic structure and any hydrogen atom may be substituted with a fluorine atom, —NH—, —N(CH$_3$)—, or the group represented by the formula (9).

$X_1$ is an aliphatic hydrocarbon group having a carbon number of 1 to 20, or a monovalent organic group including an aromatic hydrocarbon group.

The 1 is an integer of 2 to 6, $d_1$ is an integer of 2 to 4, $d_2$ and $d_3$ are each independently an integer of 1 to 3, and e and f are each independently an integer of 1 to 3.

$K_1$ and $K_2$ are each independently a hydrogen atom, an alkyl group having a carbon number of 1 to 4 which may have a substituent, alkenyl group having a carbon number of 2 to 4 which may have a substituent, or an alkynyl group having a carbon number of 2 to 4 which may have a substituent. Further, at least one of $K_1$ and $K_2$ represents a hydrocarbon group substituted with a hydroxy group. The 1 in the formula (8) is preferably 2 to 4 from the viewpoint of solubility.

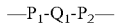 (9)

In the formula (9), $P_1$ and $P_2$ each represents independently an alkylene group having a carbon number of 1 to 5, and $Q_1$ represents an aromatic ring.

The —CH$_2$—OH group in the formulae (6) and (7) is bonded directly to an aromatic ring, so that $Y_1$, $Y_2$, and $Y_3$ are each independently an aromatic ring.

Specific examples of the aromatic ring may include a benzene ring, a naphthalene ring, a tetrahydronaphthalene ring, an azulene ring, an indene ring, a fluorene ring, an anthracene ring, a phenanthrene ring, a phenalene ring, a pyrrole ring, an imidazole ring, an oxazole ring, a triazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a triazine ring, a pyrazolidine ring, a triazole ring, a pyrazine ring, a benzimidazole ring, a benzimidazole ring, a tinoline ring, a phenanthroline ring, an indole ring, a quinoxaline ring, a benzothiazole ring, a phenothiazine ring, an acridine ring, and an oxazole ring. More preferred specific examples of the aromatic ring include a benzene ring, a naphthalene ring, a fluorene ring, an anthracene ring, a pyrrole ring, an imidazole ring, a pyrazole ring, a pyridine ring, a pyrimidine ring, a quinoline ring, an isoquinoline ring, a carbazole ring, a pyridazine ring, a pyrazine ring, a benzimidazole ring, a benzimidazole ring, an indole ring, a quinoxaline ring, and an acridine ring. More preferred examples may be a benzene ring, a naphthalene ring, a pyridine ring, a carbazole ring, and most preferred examples are a benzene ring or a pyridine ring.

Furthermore, the hydrogen atom(s) of these aromatic rings may be substituted with a hydroxyl group, an alkyl group having a carbon atom number of 1 to 3, a halogen atom, an alkoxy group having a carbon number of 1 to 3, or a vinyl group.

In the formula (7), $d_2$ and $d_3$ may be more preferably an integer of 1 or 2. Additionally, e and f may be more preferably 1 or 2.

When $Z_1$ in the formula (7) is a divalent saturated hydrocarbon group having a carbon number of 1 to 10, preferably 1 to 5 which may be entirely or partially bonded to form a cyclic structure, its any hydrogen atom may be substituted with a fluorine atom.

Examples of $Z_1$ may include an alkylene group having a carbon number of 1 to 10, an alicyclic hydrocarbon group having a carbon number of 3 to 10, and a group composed of an alkylene group and an alicyclic hydrocarbon group, and having a carbon number of 1 to 10. Additional examples may include the above-described groups wherein any hydrogen atoms are substituted with a fluorine atom.

The $Q_1$ in the formula (8) is an aromatic ring, and its specific examples may include a benzene ring, a naphthalene ring, a tetrahydronaphthalene ring, an azulene ring, an indene ring, a fluorene ring, an anthracene ring, a phenanthrene ring, a phenalene ring, a pyrrole ring, an imidazole ring, an oxazole ring, a triazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a triazine ring, a pyrazolidine ring, a triazole ring, a pyrazine ring, a benzimidazole ring, a benzimidazole ring, a tinoline ring, a phenanthroline ring, an indole ring, a quinoxaline ring, a benzothiazole ring, a phenothiazine ring, an acridine ring, and an oxazole ring. More preferred specific examples of the aromatic ring include a benzene ring, a naphthalene ring, a fluorene ring, an anthracene ring, a pyrrole ring, an imidazole ring, a pyrazole ring, a pyridine ring, a pyrimidine ring, a quinoline ring, an isoquinoline ring, a carbazole ring, a pyridazine ring, a pyrazine ring, a benzimidazole ring, a benzimidazole ring, an indole ring, a quinoxaline ring, and an acridine ring. Even more preferred examples are a benzene ring, a naphthalene ring, a pyridine ring, a carbazole ring, and a fluorene ring.

In the formula (8), at least one of $K_1$ and $K_2$ may be the structure represented by the formula (10) from the viewpoint of reactivity, and more preferably the structure represented by the following formula (11).

In the formula (8), $K_3$ to $K_6$ each independently represents a hydrogen atom, a hydrocarbon group, or a hydrocarbon group substituted with a hydroxy group.

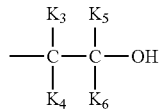
(10)

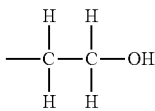
(11)

Specific examples of the specific compound used in the present invention may include, but are not limited to, the compounds [P1] to [P37].

The specific compound as the component (B) may be the compound represented by [P9], [P11], [P12], [P15], [P18], [P21], [P22], [P27], [P29] to [P37]. Among them, the compounds represented by [P9], [P11], [P12], [P15] or [P29] are more preferred.

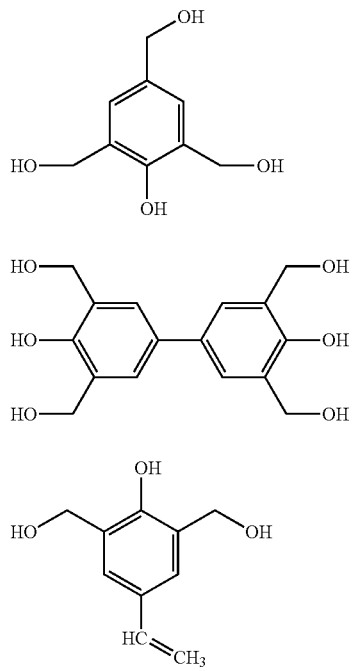

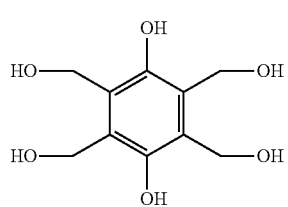

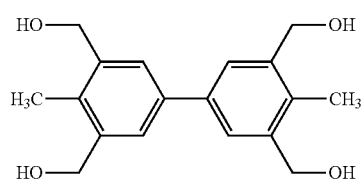

[P11]
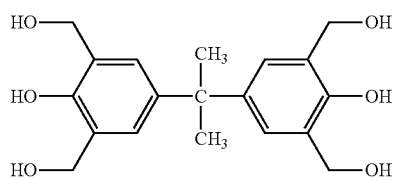
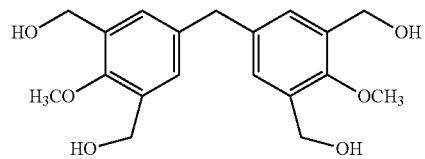
[P12]
[P13]
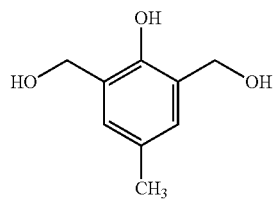
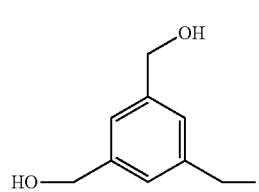
[P14]
[P15]
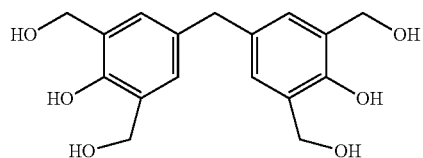
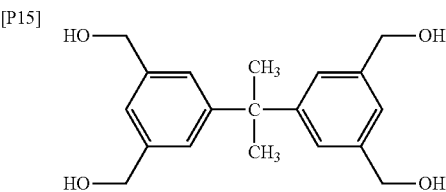
[P16]
[P17]
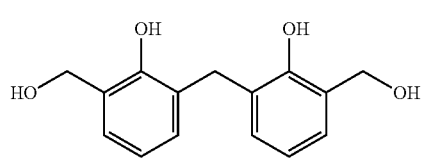
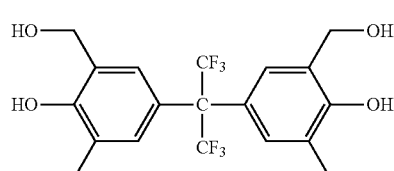
[P18]
[P19]
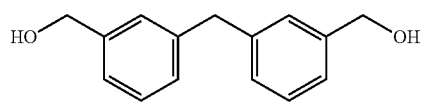
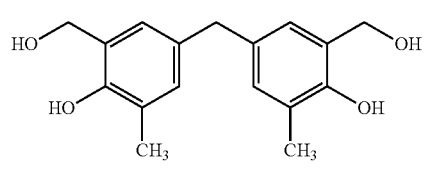
[P20]
[P21]
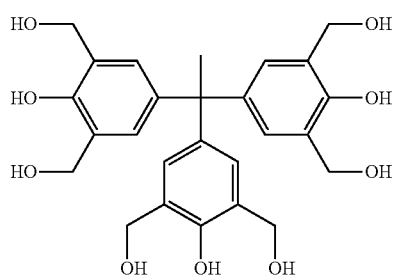
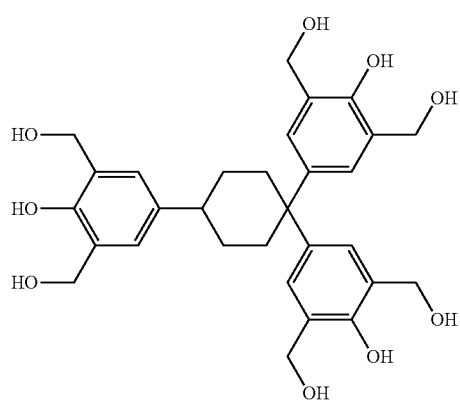
[P22]
[P23]
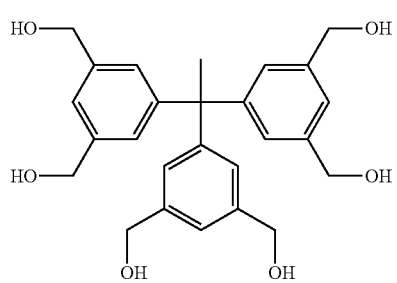
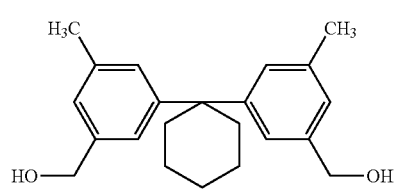
[P24]

-continued
[P25]
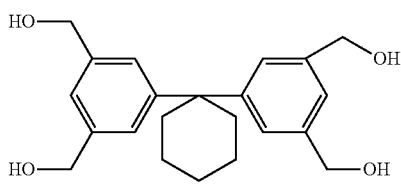
[P26]
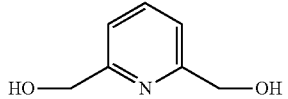
[P27]
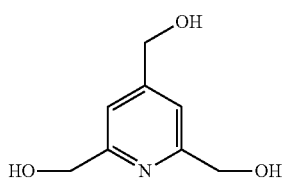
[P28]
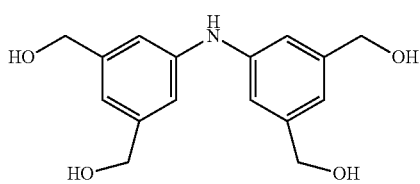
[P29]
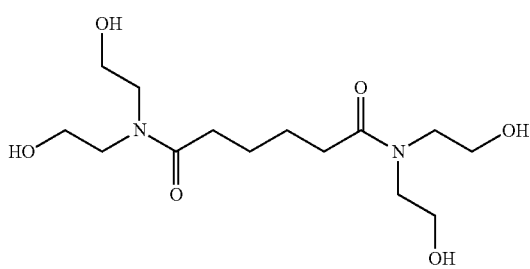
[P30]
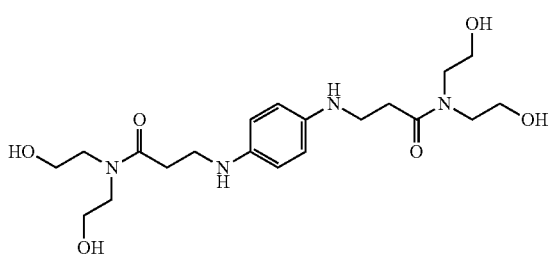
[P31]
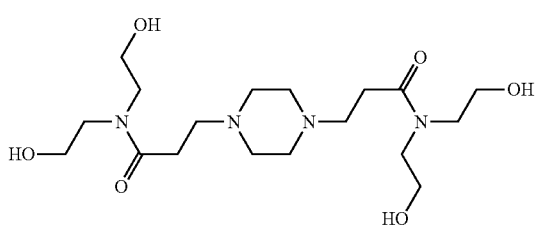
[P32]
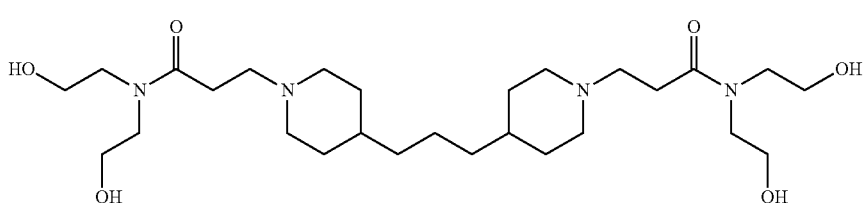
[P33]
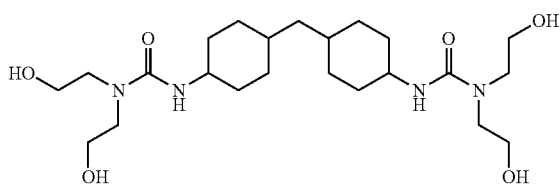
[P34]
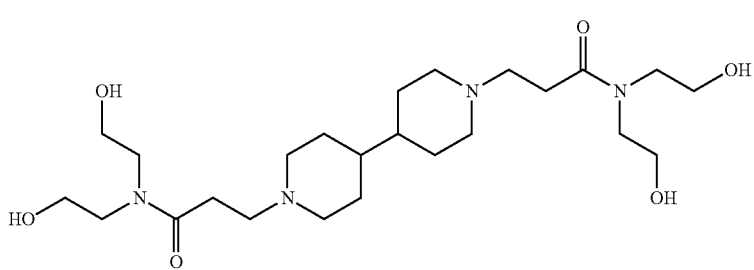

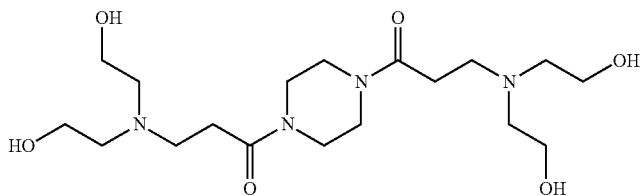

[P35]

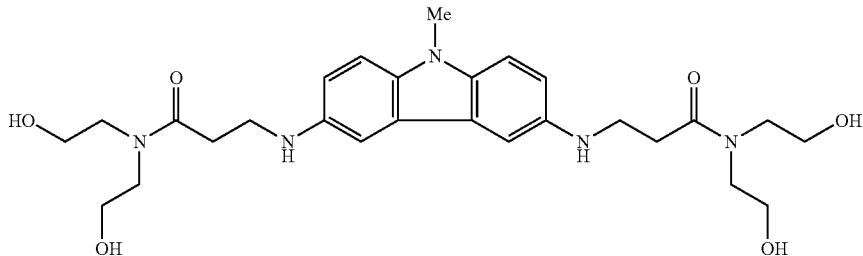

[P36]

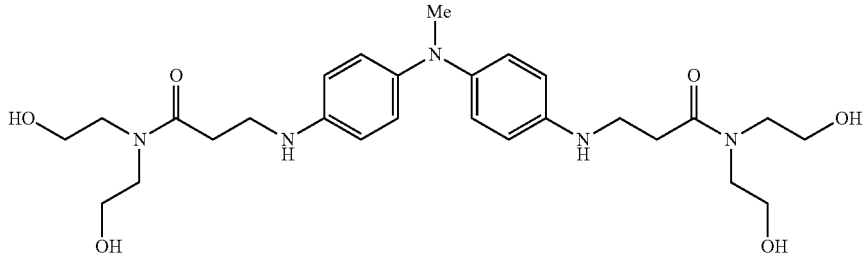

[P37]

<Method for Producing a Component (A): A Polymer Comprising a Site Having an Isocyanate Group and/or a Blocked Isocyanate Group; and a Site Having Photoalignment>

The above-described component (A): a polymer comprising a site having an isocyanate group and/or a blocked isocyanate group; and a site having photoalignment is obtained by polymerizing a monomer having an isocyanate group and/or a blocked isocyanate group represented by the above formula (1m); and a monomer having photoalignment represented by the above formula (3m) or (3m)-1.

Further, it may be copolymerized with other monomer within the range which will not impair photoalignment or crossliking reactivity with the specific compound having two or more of hydroxyl group or amino group. Examples of the other monomer may include industrially available radical polymerizable monomers.

Specific examples of the other monomer may include unsaturated carboxylic acid, an acrylic acid ester compound, a methacrylic acid ester compound, a maleimide compound, acrylonitrile, maleic anhydride, a styrene compound, and a vinyl compound.

Specific examples of unsaturated carboxylic acid may include acrylic acid, methacrylic acid, itaconic acid, maleic acid, and fumaric acid.

Examples of the acrylate compound may include methylacrylate, ethyl acrylate, isopropyl acrylate, benzyl acrylate, naphthyl acrylate, anthryl acrylate, anthryl methylacrylate, phenylacrylate, 2,2,2-trifluoroethyl acrylate, tert-butyl acrylate, cyclohexyl acrylate, isobornyl acrylate, 2-methoxyethyl acrylate, methoxy triethylene glycol acrylate, 2-ethoxyethyl acrylate, tetrahydrofurfuryl acrylate, 3-methoxy butyl acrylate, 2-methyl-2-adamantyl acrylate, 2-propyl-2-adamantyl acrylate, 8-methyl-8-tricyclodecyl acrylate, and, 8-ethyl-8-tricyclodecyl acrylate.

Examples of the methacrylate compound may include methyl methacrylate, ethyl methacrylate, isopropyl methacrylate, benzyl methacrylate, naphthyl methacrylate, anthryl methacrylate, anthryl methyl methacrylate, phenylmethacrylate, 2,2,2-trifluoroethyl methacrylate, tert-butyl methacrylate, cyclohexyl methacrylate, isobornyl methacrylate, 2-methoxyethyl methacrylate, methoxy triethylene glycol methacrylate, 2-ethoxyethyl methacrylate, tetrahydrofurfuryl methacrylate, 3-methoxy butyl methacrylate, 2-methyl-2-adamantyl methacrylate, 2-propyl-2-adamantyl methacrylate, 8-methyl-8-tricyclodecyl methacrylate, and, 8-ethyl-8-tricyclodecyl methacrylate. Other examples may include (meth)acrylate compounds having a cyclic ether group, such as glycidyl (meth)acrylate, (3-methyl-3-oxetanyl) methyl(meth)acrylate, and (3-ethyl-3-oxetanyl)methyl (meth)acrylate.

Examples of the vinyl compound may include vinyl ether, methyl vinyl ether, benzyl vinyl ether, 2-hydroxyethyl vinyl ether, phenyl vinyl ether, and propyl vinyl ether.

Examples of the styrene compound may include styrene, methylstyrene, chlorostyrene, and bromostyrene.

Examples of the maleimide compound may include maleimide, N-methyl maleimide, N-phenyl maleimide, and N-cyclohexyl maleimide.

A method for producing the component (A), specific polymer according to the present invention is not particularly limited, and a general method used industrially can be used. Specifically, the polymer can be manufactured by cationic polymerization, radical polymerization, or anionic polymerization using a vinyl group of a photoalignment monomer and a monomer having an isocyanate group or a blocked isocyanate group. Among these, radical polymerization is particularly preferable from a viewpoint of easiness of reaction control.

As a polymerization initiator of radical polymerization, a known compound such as a radical polymerization initiator or a reversible addition-fragmentation chain transfer (RAFT) polymerization reagent can be used.

A radical thermal polymerization initiator is a compound to generate a radical by heating to a decomposition temperature or higher. Examples of the radical thermal polymerization initiator include a ketone peroxide (methyl ethyl ketone peroxide, cyclohexanone peroxide, or the like), a diacyl peroxide (acetyl peroxide, benzoyl peroxide, or the like), a hydroperoxide (hydrogen peroxide, tert-butyl hydroperoxide, cumene hydroperoxide, or the like), a dialkyl peroxide (di-tert-butyl peroxide, dicumyl peroxide, dilauroyl peroxide, or the like), a peroxy ketal (dibutyl peroxy cyclohexane or the like), an alkyl perester (peroxy neo decanoic acid-tert-butyl ester, peroxy pivalic acid-tert-butyl ester, peroxy 2-ethyl cyclohexanoic acid-tert-amyl ester, or the like), a persulfate salt (potassium persulfate, sodium persulfate, ammonium persulfate, or the like), and an azo compound (azobisisobutyronitrile, 2,2'-di(2-hydroxyethyl) azobisisobutyronitrile, or the like). Such a radical thermal polymerization initiator can be used singly or in combination of two or more kinds thereof.

A radical photopolymerization initiator is not particularly limited as long as being a compound to initiate radical polymerization by light irradiation. Examples of such a radical photopolymerization initiator include benzophenone, Michler's ketone, 4,4'-bis(diethylamino) benzophenone, xanthone, thioxanthone, isopropyl thioxanthone, 2,4-diethyl thioxanthone, 2-ethyl anthraquinone, acetophenone, 2-hydroxy-2-methyl propiophenone, 2-hydroxy-2-methyl-4'-isopropyl propiophenone, 1-hydroxycyclohexyl phenyl ketone, isopropyl benzoin ether, isobutyl benzoin ether, 2,2-diethoxyacetophenone, 2,2-dimethoxy-2-phenylacetophenone, camphorquinone, benzanthrone, 2-methyl-1-[4-(methylthio) phenyl]-2-morpholinopropan-1-one, 2-benzyl-2-dimethylamino-1-(4-morpholinophenyl)-butanone-1,4-dimethylamino ethyl benzoate, 4-dimethylamino isoamyl benzoate, 4,4'-di(t-butylperoxy carbonyl) benzophenone, 3,4,4'-tri(t-butyl peroxy carbonyl) benzophenone, 2,4,6-trimethylbenzoyl diphenyl phosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl) benzoxazole, 2-(p-dimethylaminostyryl) benzothiazole, 2-mercaptobenzothiazole, 3,3'-carbonyl bis(7-diethylamino coumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonyl phenyl)-1,2'-biimidazole, 2,2'-bis(2,4-dichlorophenyl)-4,4',5,5'-tetraphenyl-1,2'-biimidazole, 2,2' bis (2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylamino propionyl) carbazole, 3,6-bis(2-methyl-2-morpholino propionyl)-9-n-dodecyl carbazole, 1-hydroxycyclohexyl phenyl ketone, bis(5-2,4-cyclo pentadiene-1-yl)-bis(2,6-difluoro-3-(1H-pyrrol-1-yl)-phenyl) titanium, 3,3',4,4'-tetra(t-butyl peroxy carbonyl) benzophenone, 3,3',4,4'-tetra(t-hexyl peroxy carbonyl) benzophenone, 3,3'-di(methoxycarbonyl)-4,4'-di(t-butylperoxy carbonyl) benzophenone, 3,4'-di(methoxycarbonyl)-4,3'-di (t-butylperoxy carbonyl) benzophenone, 4,4'-di (methoxycarbonyl)-3,3'-di(t-butylperoxy carbonyl) benzophenone, 2-(3-methyl-3H-benzothiazol-2-ylidene)-1-naphthalen-2-yl-ethanone, or 2-(3-methyl-1,3-benzothiazole-2(3H)-ylidene)-1-(2-benzoyl) ethanone. These compounds can be used singly or in combination of two or more compounds thereof.

A radical polymerization method is not particularly limited, and an emulsion polymerization method, a suspension polymerization method, a dispersion polymerization method, a precipitation polymerization method, a bulk polymerization method, a solution polymerization method, and the like can be used.

The organic solvent used in the polymerization reaction of the polymer comprising the (A-1) site having the isocyanate group and/or the blocked isocyanate group and the (A-2) site having photoalignment is not particularly limited as long as the produced polymer dissolves therein. Specific examples thereof may include the following.

N,N-dimethylformamide, N,N-dimethylacetamide, N-methyl-2-pyrrolidone, N-ethyl-2-pyrrolidone, N-methyl caprolactam, dimethyl sulfoxide, tetramethylurea, pyridine, dimethyl sulfone, hexamethyl sulfoxide, γ-butyrolactone, isopropyl alcohol, methoxymethyl pentanol, dipentene, ethyl amyl ketone, methyl nonyl ketone, methyl ethyl ketone, methyl isoamyl ketone, methyl isopropyl ketone, methyl cellosolve, ethyl cellosolve, methyl cellosolve acetate, ethyl cellosolve acetate, butyl carbitol, ethyl carbitol, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, tripropylene glycol methyl ether, 3-methyl-3-methoxy butanol, diisopropyl ether, ethyl isobutyl ether, diisobutylene, amyl acetate, butyl butyrate, butyl ether, diisobutyl ketone, methylcyclohexene, propyl ether, dihexyl ether, dioxane, n-hexane, n-pentane, n-octane, diethyl ether, cyclohexanone, ethylene carbonate, propylene carbonate, methyl lactate, ethyl lactate, methyl acetate, ethyl acetate, n-butyl acetate, propylene glycol monoethyl ether acetate, methyl pyruvate, ethyl pyruvate, methyl 3-methoxypropionate, methyl ethyl 3-ethoxypropionate, ethyl 3-methoxy propionate, 3-ethoxypropionic acid, 3-methoxypropionic acid, propyl 3-methoxy propionate, butyl 3-methoxy propionate, diglyme, 4-hydroxy-4-methyl-2-pentanone, 3-methoxy-N,N-dimethyl propanamide, 3-ethoxy-N,N-dimethyl propanamide, and 3-butoxy-N,N-dimethyl propanamide.

These organic solvents may be used alone or in mixture. Further, even a solvent which does not dissolve a generated polymer may be used within a range not to make the generated polymer precipitate while being mixed with the above organic solvents.

In addition, oxygen in an organic solvent inhibits a polymerization reaction in radical polymerization, and thus an organic solvent which has been deaerated to a possible extent is preferably used.

As a polymerization temperature in radical polymerization, any temperature in a range of 30° C. to 150° C. can be selected, and a temperature in a range of 50° C. to 100° C. is preferable. In addition, a reaction can be performed at any concentration. However, when the concentration is too low, it is difficult to obtain a polymer having a high molecular weight. When the concentration is too high, the viscosity of a reaction liquid is too high, and uniform stirring is difficult. Therefore, the monomer concentration is preferably from 1% by mass to 50% by mass, and more preferably from 5% by mass to 30% by mass. The reaction is performed at a high concentration in an initial stage of the reaction, and thereafter, an organic solvent can be added.

In the above radical polymerization reaction, a large ratio of a radical polymerization initiator with respect to a monomer makes a molecular weight of a polymer to be obtained small, and a small ratio of the radical polymerization initiator makes the molecular weight of the polymer to be obtained large. Therefore, the ratio of a radical initiator is preferably from 0.1 mol % to 10 mol % with respect to a monomer to be polymerized. In polymerization, various monomer components, solvents, initiators, and the like can be added.

[Recovery of Polymer]

In the case of recovering the generated polymer from the reaction solution of the polymer comprising the site having the isocyanate group and/or the blocked isocyanate group and the site having photoalignment that has been obtained by the above reaction, the reaction solution is poured into a poor solvent, and the polymer may be precipitated. Examples of the poor solvent used for precipitation include methanol, acetone, hexane, heptane, butyl cellosolve, heptane, methyl ethyl ketone, methyl isobutyl ketone, ethanol, toluene, benzene, diethyl ether, methyl ethyl ether, and water. A polymer precipitated by putting the reaction solution into the poor solvent can be recovered by filtration, and then can be dried at normal pressure or reduced pressure and at normal temperature or by heating. By repeating an operation for redissolving the precipitated and recovered polymer in an organic solvent and reprecipitating and recovering the polymer two to ten times, impurities in the polymer can be reduced. In this case, examples of the poor solvent include alcohols, ketones, and hydrocarbons. Use of three or more kinds of poor solvents selected from these is preferable because a purification efficiency is further increased.

Regarding the molecular weight of the (A) polymer of the present invention, in consideration of the strength of the coating film to be obtained, workability at the time of forming the coating film, and the uniformity of the coating film, the weight average molecular weight measured by a GPC (Gel Permeation Chromatography) method is preferably from 2,000 to 1,000,000, and more preferably from 5,000 to 100,000.

[Preparation of the Liquid Crystal Alignment Agent]

The liquid crystal alignment agent of the present invention may preferably be prepared as a coating solution so as to be suitable for forming a liquid crystal alignment film. That is, the liquid crystal alignment agent of the present invention may preferably be prepared as a solution in which a resin component for forming a resin film is dissolved in an organic solvent. Here, the resin component means the above-described component (A), specific polymer, and the above-described component (B), specific compound. In this case, the content of the resin component may be preferably from 1% by mass to 20% by mass, more preferably from 2% by mass to 15% by mass, and particularly preferably from 2% by mass to 10% by mass.

In the liquid crystal alignment agent of the present embodiment, the above-described resin component may be entirely the component (A), specific polymer, and the component (B), specific compound, but another polymer different therefrom may be mixed therein as long as the photoalignment ability or crossliking reactivity are not impaired. In this case, the content of the other polymer in the resin component may be from 0.5% by mass to 90% by mass, preferably from 1% by mass to 80% by mass.

Such another polymer is constituted by, for example, poly (meth)acrylate, polyamic acid, or polyimide which is, for example, not a polymer comprising a site having an isocyanate group and/or a blocked isocyanate group; and a site having photoalignment.

<Organic Solvent>

The organic solvent used for the liquid crystal alignment agent used in the present invention is not particularly limited as long as the organic solvent dissolves the resin component. Specific examples thereof may include the following:

N,N-dimethylformamide, N,N-dimethylacetamide, N-methyl-2-pyrrolidone, N-methylcaprolactam, 2-pyrrolidone, M-ethylpyrrolidone, N-vinylpyrrolidone, dimethylsulfoxide, tetramethylurea, pyridine, dimethylsulfone, hexamethylsulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, and tripropylene glycol methyl ether. These may be used alone or in mixture.

The liquid crystal alignment agent used in the present invention may comprise components other than the above-described components (A) and (B). Examples thereof may include, but are not limited to, solvents and compounds for improving film thickness uniformity and surface smoothness when the liquid crystal alignment agent is applied, compounds for improving the adhesion between the liquid crystal alignment film and the substrate, and the like.

Specific examples of the solvent (poor solvent) for improving the uniformity of film thickness and surface smoothness may include the following:

Solvents having low surface tension such as isopropyl alcohol, methoxymethylpentanol, methyl cellosolve, ethyl cellosolve, butyl cellosolve, methyl cellosolve acetate, ethyl cellosolve acetate, butyl carbitol, ethyl carbitol, ethyl carbitol acetate, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, tripropylene glycol methyl ether, 3-methyl-3-methoxybutanol, diisopropyl ether, ethyl isobutyl ether, diisobutylene, amyl acetate, butyl butyrate, butyl ether, diisobutyl ketone, methylcyclohexene, propyl ether, dihexyl ether, 1-hexanol, n-hexane, n-pentane, n-octane, diethyl ether, methyl lactate, ethyl lactate, methyl acetate, ethyl acetate, n-butyl acetate, propylene glycol acetate monoethyl ether, methyl pyruvate, ethyl pyruvate, methyl 3-methoxypropionate, methylethyl 3-ethoxypropionate, ethyl 3-methoxypropionate, 3-ethoxypropionic acid, 3-methoxypropionic acid, propyl 3-methoxypropionate, butyl 3-methoxypropionate, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-ethoxypropoxy)propanol, methyl lactate, ethyl lactate, n-propyl lactate, n-butyl lactate and isoamyl lactate.

These poor solvents may be used alone or in combination of two or more. In the case of using a solvent described above, the solvent is preferably 5% by mass to 80% by mass of the whole solvent, and more preferably 20% by mass to 60% by mass such that the solubility of the whole solvent contained in the liquid crystal alignment agent is not significantly lowered.

In a case where the above-described component (A), in particular, the component (A-1) comprises an unblocked isocyanate group, and where the above solvent has a hydroxyl group, the isocyanate group in the component (A), specific polymer can react with the hydroxyl group in the above solvent, and there is a possibility to reduce the crosslinking reactivity of the component (A), specific polymer. Thus, preferably, the above solvent may be the solvent having no hydroxyl group.

Examples of the compound for improving uniformity of film thickness and surface smoothness may include fluorine-based surfactants, silicone-based surfactants, and nonionic surfactants.

More specific examples thereof may include EFTOP (registered trademark) 301, EF303, and EF352 (manufactured by Tochem Products), MEGAFACE (registered trademark) F171, F173, and R-30 (manufactured by DIC Corporation), Fluorad FC430 and FC431 (manufactured by Sumitomo 3M Ltd.), Asahi Guard (registered trademark) AG710 (manufactured by Asahi Glass Co., Ltd.), and Surflon (registered trademark) S-382, SC101, SC102, SC103, SC104, SC105, and SC106 (manufactured by AGC Seimi Chemical Co., Ltd.). The use ratio of these surfactants may be preferably 0.01 parts by mass to 2 parts by mass, and more preferably 0.01 parts by mass to 1 part by mass, with respect to 100 parts by mass of the resin component contained in the polymer composition.

Specific examples of the compound that improves the adhesion between the liquid crystal alignment film and the substrate may include the functional silane-containing compounds described below.

Examples thereof may include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, and N-bis(oxyethylene)-3-aminopropyltriethoxysilane.

Furthermore, for the purpose of preventing deterioration of the electric characteristics and the like due to the backlight when constituting the liquid crystal display element in addition to improving the adhesion between the substrate and the liquid crystal alignment film, phenoplast-based additives or epoxy group-containing compound additives shown below may be contained in the polymer composition. Specific phenoplast additives are shown below, but the present invention is not limited to these structures. Specific examples of epoxy group-containing compounds may include, but are not limited to, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, 2,2-dibromoneopentyl glycol diglycidyl ether, 1,3,5,6-tetraglycidyl-2,4-hexanediol, N,N,N',N',-tetraglycidyl-m-xylenediamine, 1,3-bis(N,N-diglycidylaminomethyl)cyclohexane, and N,N,N',N',-tetraglycidyl-4,4'-diaminodiphenylmethane.

In the case of using a compound which improves the adhesion to the substrate, the amount used may be preferably 0.1 parts by mass to 30 parts by mass, more preferably 1 part by mass to 20 parts by mass with respect to 100 parts by mass of the resin component contained in the polymer composition. When the amount used is less than 0.1 parts by mass, the effect of improving the adhesion cannot be expected, and when the amount is more than 30 parts by mass, the alignment property of the liquid crystal may be poor.

A photosensitizer can also be used as an additive. Colorless sensitizers and triplet sensitizers are preferable.

Examples of the photosensitizers may include aromatic nitro compounds, coumarin (7-diethylamino-4-methylcoumarin, and 7-hydroxy4-methylcoumarin), ketocoumarin, carbonylbiscoumarin, aromatic 2-hydroxyketone, aromatic 2-hydroxyketone substituted with an amino group (2-hydroxybenzophenone, and mono- or di-p-(dimethylamino)-2-hydroxybenzophenone), acetophenone, anthraquinone, xanthone, thioxanthone, benzanthrone, thiazoline (2-benzoylmethylene-3-methyl-β-naphthothiazoline, 2-(β-naphthoylmethylene)-3-methylbenzothiazoline, 2-(α-naphthoylmethylene)-3-methylbenzothiazoline, 2-(4-biphenoylmethylene)-3-methylbenzothiazoline, 2-(β-naphthoylmethylene)-3-methyl-β-naphthothiazoline, 2-(4-biphenoylmethylene)-3-methyl-β-naphthothiazoline, 2-(β-fluorobenzoylmethylene)-3-methyl-β-naphthothiazoline), oxazoline (2-benzoylmethylene-3-methyl-β-naphthoxazoline, 2-(β-naphthoylmethylene)-3-methylbenzoxazoline, 2-(α-naphthoylmethylene)-3-methylbenzoxazoline, 2-(4-biphenoylmethylene)-3-methylbenzoxazoline, 2-(β-naphthoylmethylene)-3-methyl-β-naphthoxazoline, 2-(4-biphenoylmethylene)-3-methyl-β-naphthoxazoline, 2-(p-fluorobenzoylmethylene)-3-methyl-β-naphthoxazoline), benzothiazole, nitroaniline (m- or p-nitroaniline, and 2,4,6-trinitroaniline) or nitroacenaphthene (5-nitroacenaphthene), (2-[(m-hydroxy-p-methoxy)styryl]benzothiazole, benzoin alkyl ether, N-alkylated phthalone, acetophenone ketal (2,2-dimethoxyphenylethanone), naphthalene, anthracene (2-naphthalenemethanol, 2-naphthalenecarboxylic acid, 9-anthracenemethanol, and 9-anthracenecarboxylic acid), benzopyran, azoindolizine, and methylcoumarin.

Aromatic 2-hydroxyketone (benzophenone), coumarin, ketocoumarin, carbonylbiscoumarin, acetophenone, anthraquinone, xanthone, thioxanthone, or acetophenone ketal may be preferable.

In addition to the above-described ones, the liquid crystal alignment agent may comprise, as long as the effect of the present invention is not impaired, a dielectric substance, a conductive substance for the purpose of changing the electric characteristics such as the dielectric constant and the conductivity of the liquid crystal alignment film. Further, the liquid crystal alignment agent may comprise a crosslinking compound for the purpose of increasing the hardness and denseness of the film when formed into a liquid crystal alignment film.

<Liquid Crystal Alignment Film and Liquid Crystal Display Element>

The liquid crystal aligning agent of the present invention can be made into a liquid crystal alignment film by applying it on a substrate, baking, and subjecting the object to alignment treatment by, for example, polarized light irradiation.

The method for applying the liquid crystal aligning agent of the present invention is not particularly limited, and is commonly screen printing, flexographic printing, offset printing, or inkjet. Alternatively, other means using a coating solution such as a dip, a roll coater, a slit coater, or a spinner may be used according to the intended use. The agent is applied on a substrate by any of these methods, and then the solvent is evaporated by a heating means such as a hot plate, thereby forming a coating film.

Baking after applying the liquid crystal aligning agent may be carried out at any temperature from 50 to 300° C., preferably from 80° C. to 250° C., and more preferably from 80° C. to 230° C. This baking operation may be carried out with, for example, a hot plate, a hot air circulation furnace, or an infrared radiation furnace.

The rubbing treatment may use, for example, rayon cloth, nylon cloth, or cotton cloth. If the liquid crystal alignment film is used for vertical alignment, a uniform alignment state is hard to be achieved by rubbing treatment. Therefore, when the liquid crystal aligning agent is used for vertical alignment, it is preferably without rubbing.

Photoalignment treatment is carried out with a linearly polarized ultraviolet exposure apparatus by applying linearly polarized ultraviolet light having a wavelength of 200 nm to 450 nm to a coating film formed on a substrate. The more preferred wavelength of the linearly polarized ultraviolet light is 250 nm to 400 nm.

The liquid crystal cells of the present invention can be made by an ordinary method, and the making method is not particularly limited. According to a common method, a sealing agent is applied on glass substrates at least one of which has a liquid crystal alignment film thereon, a spacer is spread so as to maintain a certain gap, and then the two substrates are bonded together, the sealing agent is cured to make empty cells, then liquid crystal is injected into them under vacuum from a liquid crystal inlet, and the inlet is sealed to make liquid crystal cells; alternatively, liquid crystal is dropped to a substrate onto which a spacer is dispersed, and then the two substrates are bonded together to make liquid crystal cells. The liquid crystal may be selected, depending on the intended use, and examples may include a fluorine liquid crystal and a cyano liquid crystal having positive or negative dielectric constant anisotropy.

As described above, the liquid crystal alignment film obtained from the liquid crystal aligning agent of the present invention can give large pretilt angles to liquid crystal, and thus is useful as a liquid crystal alignment film for vertical alignment purposes.

The present invention will be further illustrated hereinafter with reference to Examples, but the present invention will not be limited thereto.

EXAMPLES

Of the components (A) used in Examples, the structures of the (meth)acrylate compounds, which are the monomers capable of forming a site having photoalignment, are depicted by MA-1 to MA-5 and MA-6 to MA-9. MA-1 to MA-5 are novel compounds not disclosed in literatures, and their synthesis methods are described in detail in following Synthesis Examples 1 to 5. MA-6 and MA-9 were synthesized by known methods and available. MA-7 and MA-8 were manufactured by Tokyo Chemical Industry Co., Ltd. In the formula, "t" means that the cyclohexyl group is in the trans form.

Additionally, of the components (A), the monomer capable of forming a site having an isocyanate group and/or a blocked isocyanate group is described below.

Furthermore, the structure of the components (B) (specific compound) used in Examples are depicted by CR-1 to CR-3. Furthermore, HEMA was polymerized in the below-described Examples 18 and 19, and then the resulting polymer was used as the component (B) (specific compound).

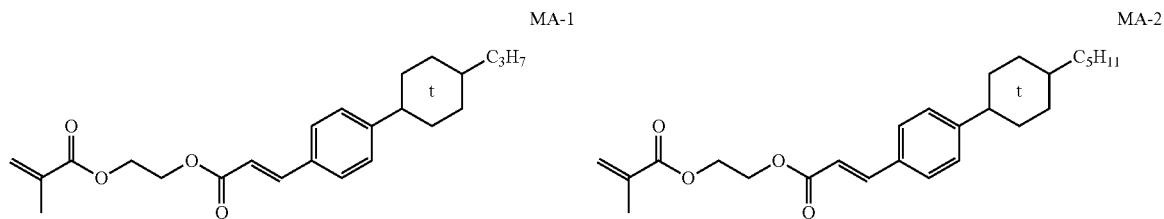

-continued
MA-3
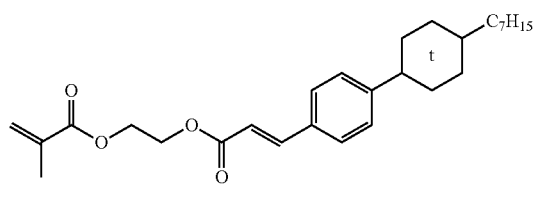
MA-4
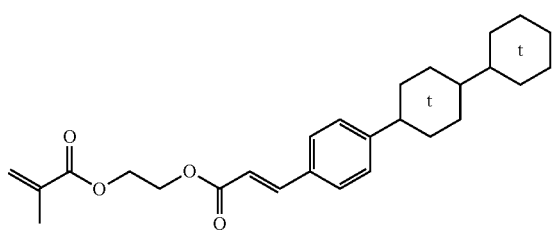
MA-5
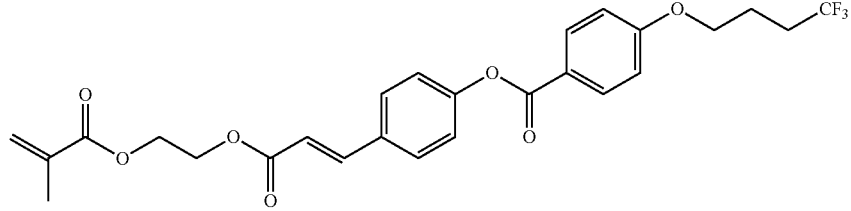
MA-6
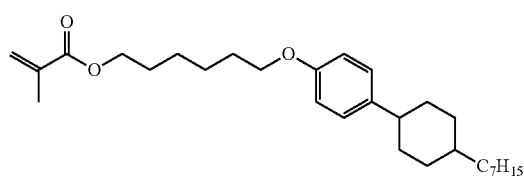
MA-7
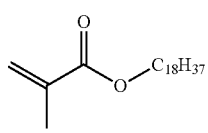
MA-8
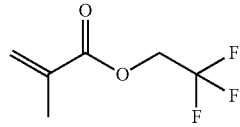
MA-9
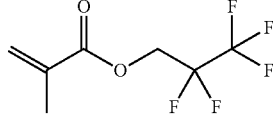
MOI
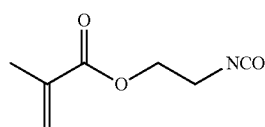
MOI-BM
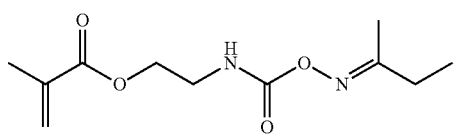
MOI-BP
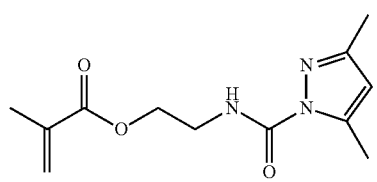
MOI-DEM
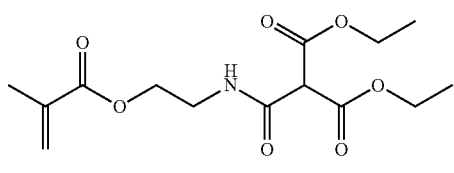
CHMI
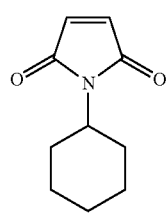
CR-1
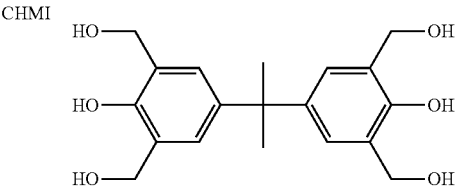

CR-2

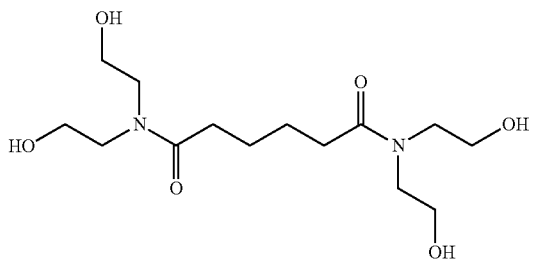

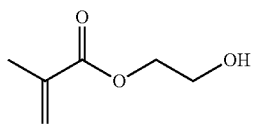

CR-3

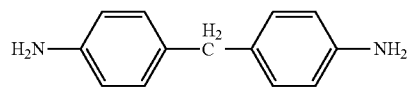

HEMA

The abbreviations of the organic solvents used in Examples are as follows.
NMP: N-methyl-2-pyrrolidone
BC: butyl cellosolve
THF: tetrahydrofuran
DMF: N,N-dimethylformamide
DMAc: N,N-dimethylacetamide
PGME: propylene glycol monomethyl ether
PGMEA: propylene glycol monomethyl ether acetate
CHN: cyclohexanone The abbreviation of the polymerization initiator used in Examples is as follows.
AIBN: 2,2'-azobisisobutyronitrile <Measurement of $^1$HNMR>

Apparatus: Fourier transformation superconductive nuclear magnetic resonance apparatus (FT-NMR) "INOVA-400" (Varian) 400 MHz.
Solvent: deuterated chloroform (CDCl$_3$) or deuterated N,N-dimethyl sulfoxide ([D$_6$]-DMSO).
Reference material: tetramethylsilane (TMS).

Synthesis Example 1

Synthesis of [MA-1]:

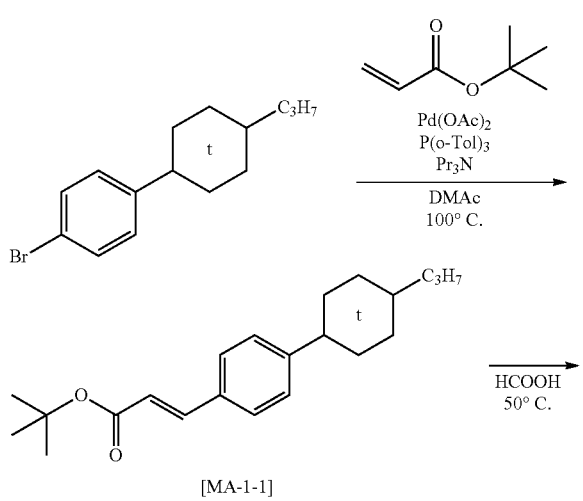

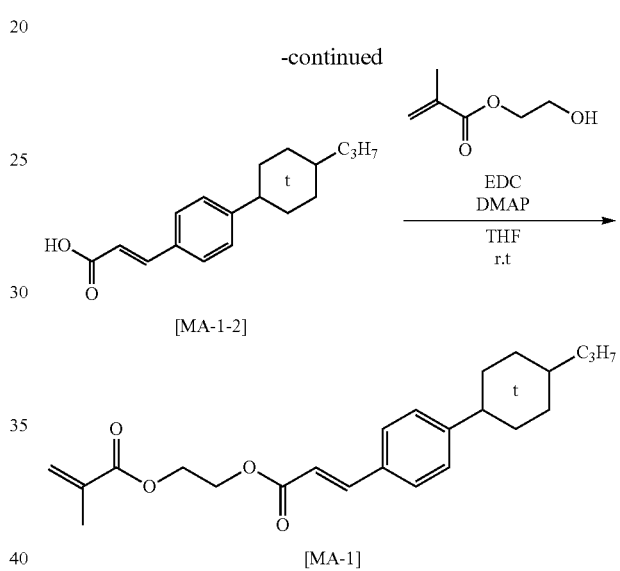

1-bromo-4-(trans-4-propylcyclohexyl)-benzene (150.0 g, 533 mmol), tert-butyl acrylate (102.5 g, 800 mmol), palladium acetate (2.39 g, 11 mmol), tri(o-tolyl)phosphine (6.49 g, 21 mmol), tripropylamine (229.3 g, 1600 mmol), and DMAc (750 g) were placed in a 2-L four-necked flask, and stirred under heating at 100° C. After completion of the reaction, the reaction liquid was filtered to remove insoluble matter, the filtrate was poured into pure water (3.8 L), and neutralized with 12 N—HCl aqueous solution. After neutralization, ethyl acetate (2.5 L) was poured thereinto, and extraction was carried out. Anhydrous magnesium sulfate was added to the extracted organic layer, the mixture was dried by dehydration, and anhydrous magnesium sulfate was filtrated. The filtrate thus obtained was evaporated to remove the solvent with a rotary evaporator, and the crude product was subjected to repulping washing with cold methanol (180 g), thereby to obtain 144.0 g of [MA-1-1] (white solid) (yield: 82%).

[MA-1-1] (144.0 g, 441 mmol) and formic acid (1000 g) were placed in a 2-L four-necked flask, and stirred under heating at 50° C. After completion of the reaction, the reaction liquid was poured into pure water (3.0 L), the precipitate was filtrated. The crude product thus obtained was subjected to repulping washing with ethyl acetate (200 g), thereby to obtain 111.1 g of [MA-1-2] (white solid)

(yield: 92%). The result of ¹H-NMR of the objective is given below. This result confirms that the solid thus obtained is the desired [MA-1-2].

1H NMR (400 MHz, [D₆]-DMSO): δ12.34 (s, 1H), 7.53-7.60 (m, 3H), 7.25-7.27 (d, 2H), 6.44-6.48 (d, 1H), 2.45-2.51 (t, 1H), 1.76-1.83 (t, 4H), 1.28-1.48 (m, 5H), 1.15-1.21 (m, 2H), 0.97-1.07 (m, 2H), 0.87-0.89 (t, 3H).

[MA-1-2] (30.0 g, 110 mmol), 2-hydroxyethyl methacrylate (17.2 g, 132 mmol), 1-(3-dimethylaminopropyl)-3-ethylcarbodiimide hydrochloride (EDC) (25.7 g, 165 mmol), 4-dimethylaminopyridine (1.35 g, 11 mmol), and THF (150 g) were placed in a 2-L four-necked flask, and stirred at room temperature. After completion of the reaction, the reaction liquid was poured into ethyl acetate (1.0 L), extraction was carried out using pure water (800 mL). Anhydrous magnesium sulfate was added to the extracted organic layer, the mixture was dried by dehydration, and anhydrous magnesium sulfate was filtrated. The filtrate thus obtained was evaporated to remove the solvent with a rotary evaporator. The residue thus obtained was isolated by silica gel column chromatography (ethyl acetate:hexane=1:5 volume ratio), thereby to obtain 26.8 g of [MA-1] (white solid) (yield: 55%). The result of ¹H-NMR of the objective is given below. This result confirmed that the solid thus obtained is the desired [MA-1].

1H NMR (400 MHz, [D₆]-DMSO): δ7.62-7.66 (m, 3H), 7.25-7.27 (d, 2H), 6.58-6.62 (d, 1H), 6.05 (s, 1H), 5.70 (s, 1H), 4.37-4.42 (m, 4H), 2.44-2.48 (t, 1H), 1.88 (s, 3H), 1.76-1.82 (t, 4H), 1.24-1.47 (m, 5H), 1.15-1.21 (m, 2H), 0.96-1.06 (m, 2H), 0.85-0.89 (t, 3H).

Synthesis Example 2

Synthesis of [MA-2]:

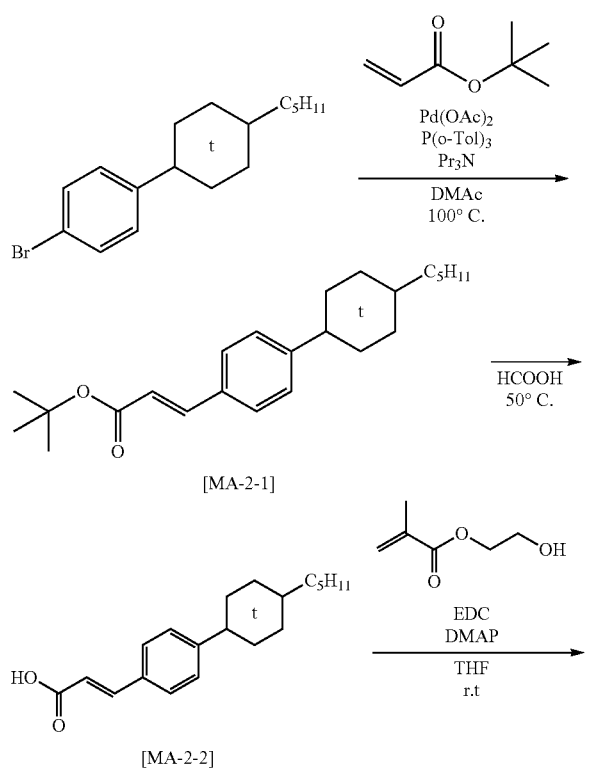

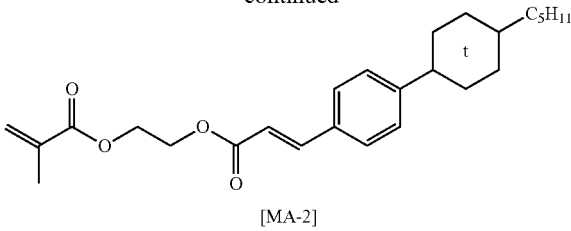

[MA-2]

1-bromo-4-(trans-4-pentyl cyclohexyl)-benzene (150.0 g, 485 mmol), tert-butyl acrylate (93.24 g, 728 mmol), palladium acetate (2.18 g, 9.7 mmol), tri(o-tolyl)phosphine (5.90 g, 20 mmol), tripropylamine (208.5 g, 1455 mmol), and DMAc (750 g) were placed in a 2-L four-necked flask, and stirred under heating at 100° C. After completion of the reaction, the reaction liquid was filtered to remove insoluble matter, the filtrate was poured into pure water (3.8 L), and neutralized with a 12 N—HCl aqueous solution. After neutralization, ethyl acetate (2.5 L) was poured, and extraction was carried out. To the extracted organic layer, anhydrous magnesium sulfate was added and dried by dehydration, and the anhydrous magnesium sulfate was filtered. The filtrate thus obtained was evaporated to remove the solvent with a rotary evaporator, and the crude product was subjected to repulping washing with cold methanol (190 g), thereby to obtain 137.0 g of [MA-2-1] (white solid) (yield: 79%).

[MA-2-1] (137.0 g, 384 mmol), formic acid (1000 g) were placed in a 2-L four-necked flask, and stirred under heating at 50° C. After completion of the reaction, the reaction liquid was poured into pure water (3.0 L), and the precipitate was filtrated. The crude product thus obtained subjected to repulping washing using ethyl acetate (200 g), thus obtaining 111.8 g of [MA-2-2] (white solid) (yield: 96%). The result of ¹H-NMR of the objective is given below. This result confirmed that the solid thus obtained is the desired [MA-2-2].

1H NMR (400 MHz, [D₆]-DMSO): δ12.34 (s, 1H), 7.53-7.60 (m, 3H). 7.25-7.27 (d, 2H), 6.44-6.48 (d, 1H), 2.45-2.51 (t, 1H), 1.77-1.83 (t, 4H), 1.38-1.48 (m, 2H), 1.17-1.34 (m, 9H), 0.97-1.07 (m, 2H), 0.87-0.89 (t, 3H).

[MA-2-2] (30.0 g, 100 mmol), 2-hydroxyethyl methacrylate (15.6 g, 119 mmol), 1-(3-dimethylaminopropyl)-3-ethyl carbodiimide hydrochloride (EDC) (28.7 g, 150 mmol), 4-dimethylaminopyridine (1.22 g, 10 mmol), and THF (150 g) were placed in a 2-L four-necked flask, and stirred at room temperature. After completion of the reaction, the reaction liquid was poured into ethyl acetate (1.0 L), extraction was carried out using pure water (800 mL). To the extracted organic layer, anhydrous magnesium sulfate was added and dried by dehydration, and the anhydrous magnesium sulfate was filtered. The filtrate thus obtained was evaporated to remove the solvent with a rotary evaporator. The residue thus obtained was isolated by silica gel column chromatography (ethyl acetate:hexane=1:5 volume ratio), thereby to obtain 36.6 g of [MA-2] (white solid) (yield: 88%). The result of ¹H-NMR of the objective is given below. The result confirmed that the solid thus obtained is the desired [MA-2].

1H NMR (400 MHz, [D₆]-DMSO): δ7.62-7.66 (m, 3H), 7.25-7.27 (d, 2H), 6.58-6.62 (d, 1H), 6.04 (s, 1H), 5.70 (s, 1H), 4.36-4.42 (m, 4H), 2.48-2.52 (t, 1H), 1.88 (s, 3H), 1.76-1.83 (t, 4H), 1.36-1.44 (m, 2H), 1.18-1.31 (m, 9H), 1.00-1.03 (m, 2H), 0.85-0.88 (t, 3H).

Synthesis Example 3

Synthesis of [MA-3]:

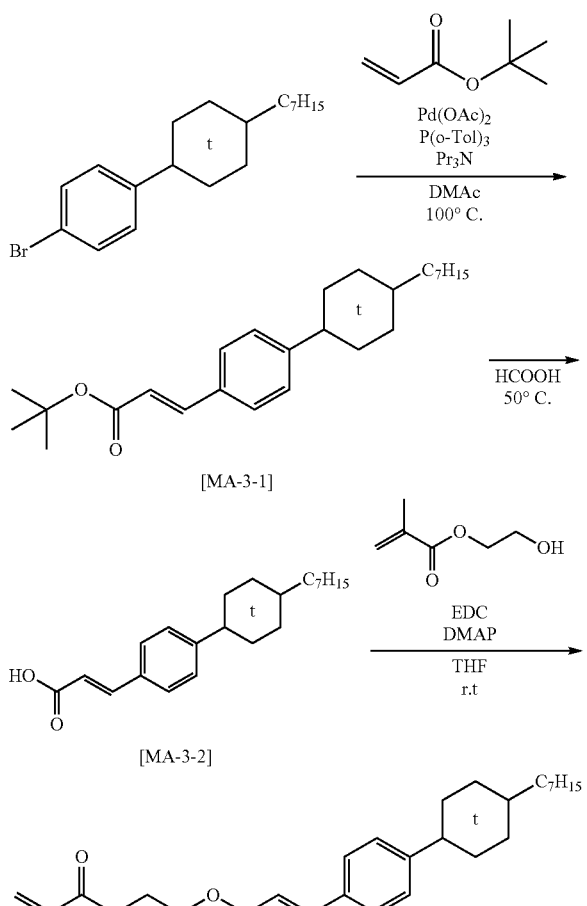

1-bromo-4-(trans-4-heptyl cyclohexyl)-benzene (150.0 g, 445 mmol), tert-butyl acrylate (85.5 g, 667 mmol), palladium acetate (0.90 g, 8.9 mmol), tri(o-tolyl)phosphine (5.41 g, 18 mmol), tripropylamine (191.1 g, 1334 mmol), and DMAc (750 g) were placed in a 2-L four-necked flask, and stirred under heating at 100° C. After completion of the reaction, the reaction liquid was filtered to remove insoluble matter, the filtrate was poured into pure water (3.8 L), and neutralized with a 12 N—HCl aqueous solution. After neutralization, ethyl acetate (2.5 L) was poured, and extraction was carried out. To the extracted organic layer, anhydrous magnesium sulfate was added and dried by dehydration, and the anhydrous magnesium sulfate was filtered. The filtrate thus obtained was evaporated to remove the solvent with a rotary evaporator, the crude product was subjected to repulping washing with cold methanol (180 g), thereby to obtain 151.6 g of [MA-3-1] (white solid) (yield: 89%).

[MA-3-1] (151.6 g, 394 mmol) and formic acid (1061 g) were placed in a 2-L four-necked flask, and stirred under heating at 50° C. After completion of the reaction, the reaction liquid was poured into pure water (3.0 L), and the precipitate was filtrated. The crude product thus obtained was subjected to repulping washing with ethyl acetate (500 g), thereby to obtain 121.7 g of [MA-3-2] (white solid) (yield: 94%). The result of $^1$H-NMR of the objective is given below. The result confirmed that the solid thus obtained is the desired [MA-3-2].

1H NMR (400 MHz, [$D_6$]-DMSO): δ12.34 (s, 1H), 7.53-7.59 (m, 3H), 7.25-7.27 (d, 2H), 6.44-6.48 (d, 1H), 2.44-2.51 (t, 1H), 1.77-1.82 (t, 4H), 1.37-1.48 (m, 2H), 1.17-1.28 (m, 13H), 0.97-1.07 (m, 2H), 0.86-0.88 (t, 3H).

[MA-3-2] (30.0 g, 91 mmol), methacrylic acid 2-hydroxyethyl (14.3 g, 110 mmol), 1-(3-dimethylaminopropyl)-3-ethyl carbodiimide hydrochloride (EDC) (26.3 g, 137 mmol), 4-dimethylaminopyridine (1.12 g, 9.1 mmol), and THF (150 g) were placed in a 2-L four-necked flask, and stirred at room temperature. After completion of the reaction, the reaction liquid was poured into ethyl acetate (1.0 L), extraction was carried out using pure water (800 mL). To the extracted organic layer, anhydrous magnesium sulfate was added and dried by dehydration, and the anhydrous magnesium sulfate was filtered. The filtrate thus obtained was evaporated to remove the solvent with a rotary evaporator. The residue thus obtained was isolated by silica gel column chromatography (ethyl acetate:hexane=1:5 volume ratio), thereby to obtain 34.5 g of [MA-3] (white solid) (yield: 86%). The result of $^1$H-NMR of the objective is given below. The result confirmed that the solid thus obtained is the desired [MA-3].

1H NMR (400 MHz, [$D_6$]-DMSO): δ7.61-7.66 (m, 3H), 7.24-7.26 (d, 2H), 6.57-6.61 (d, 1H), 6.04 (s, 1H), 5.69 (s, 1H), 4.36-4.42 (m, 4H), 2.43-2.52 (t, 1H), 1.88 (s, 3H), 1.76-1.82 (t, 4H), 1.36-1.46 (m, 2H), 1.15-1.29 (m, 13H), 0.95-1.05 (m, 2H), 0.84-0.87 (t, 3H).

Synthesis Example 4

Synthesis of [MA-4]:

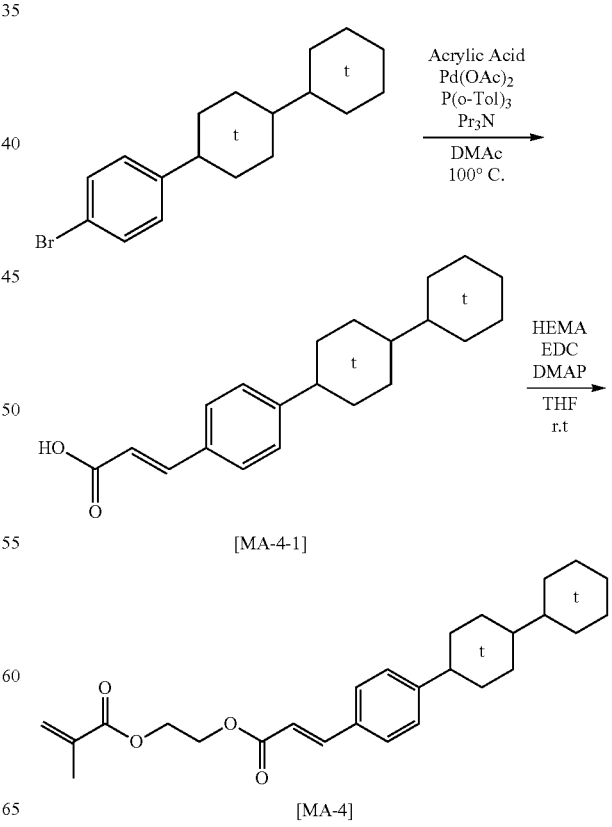

1-trans[1,1'-bicyclohexyl]-4-yl-4-bromobenzene (200.0 g, 623 mmol), acrylic acid (67.3 g, 934 mmol), palladium acetate (2.80 g, 12.4 mmol), tri(o-tolyl)phosphine (7.58 g, 25 mmol), tripropylamine (267.5 g, 1867 mmol) and DMAc (400 g) was placed in a 1-L four-necked flask, and stirred under heating at 100° C. After completion of the reaction, the reaction liquid was filtered to remove insoluble matter, the filtrate was poured into pure water (2.0 L), neutralized with 12 N—HCl aqueous solution, and the precipitate was filtrated. The crude product thus obtained was subjected to repulping washing with methanol (200 g), thereby to obtain 154.1 g of [MA-4-1] (white solid) (yield: 79%). The result of $^1$H-NMR of the objective is given below. The result confirmed that the solid thus obtained is the desired [MA-4-1].

1H NMR (400 MHz, [D$_6$]-DMSO): δ12.36 (s, 1H), 7.52-7.59 (m, 3H). 7.25-7.27 (d, 2H), 6.44-6.48 (d, 1H), 2.44-2.50 (t, 1H), 1.79-1.82 (m, 4H), 1.61-1.70 (m, 5H), 1.40-1.42 (d, 2H), 1.14-1.20 (m, 7H), 0.97-1.02 (m, 2H).

[MA-4-1] (100.0 g, 320 mmol), 2-hydroxyethyl methacrylate (45.8 g, 352 mmol), 1-(3-dimethylaminopropyl)-3-ethylcarbodiimide hydrochloride (EDC) (92.0 g, 480 mmol), 4-dimethylaminopyridine (3.91 g, 32 mmol), and THF (1000 g) were placed in a 2-L four-necked flask, and stirred at room temperature. After completion of the reaction, the reaction liquid was poured into ethyl acetate (0.5 L), and extraction was carried out using pure water (400 mL). To the extracted organic layer, anhydrous magnesium sulfate was added and dried by dehydration, and the anhydrous magnesium sulfate was filtered. The filtrate thus obtained was evaporated to remove the solvent with a rotary evaporator. The residue thus obtained was isolated by silica gel column chromatography (ethyl acetate:hexane=1:5 volume ratio), thereby to obtain 109.8 g of [MA-4] (white solid) (yield: 80%). The result of $^1$H-NMR of the objective is given below. The result confirmed that the solid thus obtained is the desired [MA-4].

1H NMR (400 MHz, [D$_6$]-DMSO): δ7.62-7.66 (m, 3H), 7.25-7.27 (d, 2H), 6.58-6.62 (d, 1H), 6.04 (s, 1H), 5.70 (s, 1H), 4.38-4.41 (m, 4H), 2.43-2.51 (t, 1H), 1.88 (s, 3H), 1.79-1.82 (m, 4H), 1.60-1.69 (m, 5H), 1.39-1.42 (d, 2H), 1.13-1.20 (m, 7H), 0.96-1.02 (m, 2H).

Synthesis Example 5

Synthesis of [MA-5]:

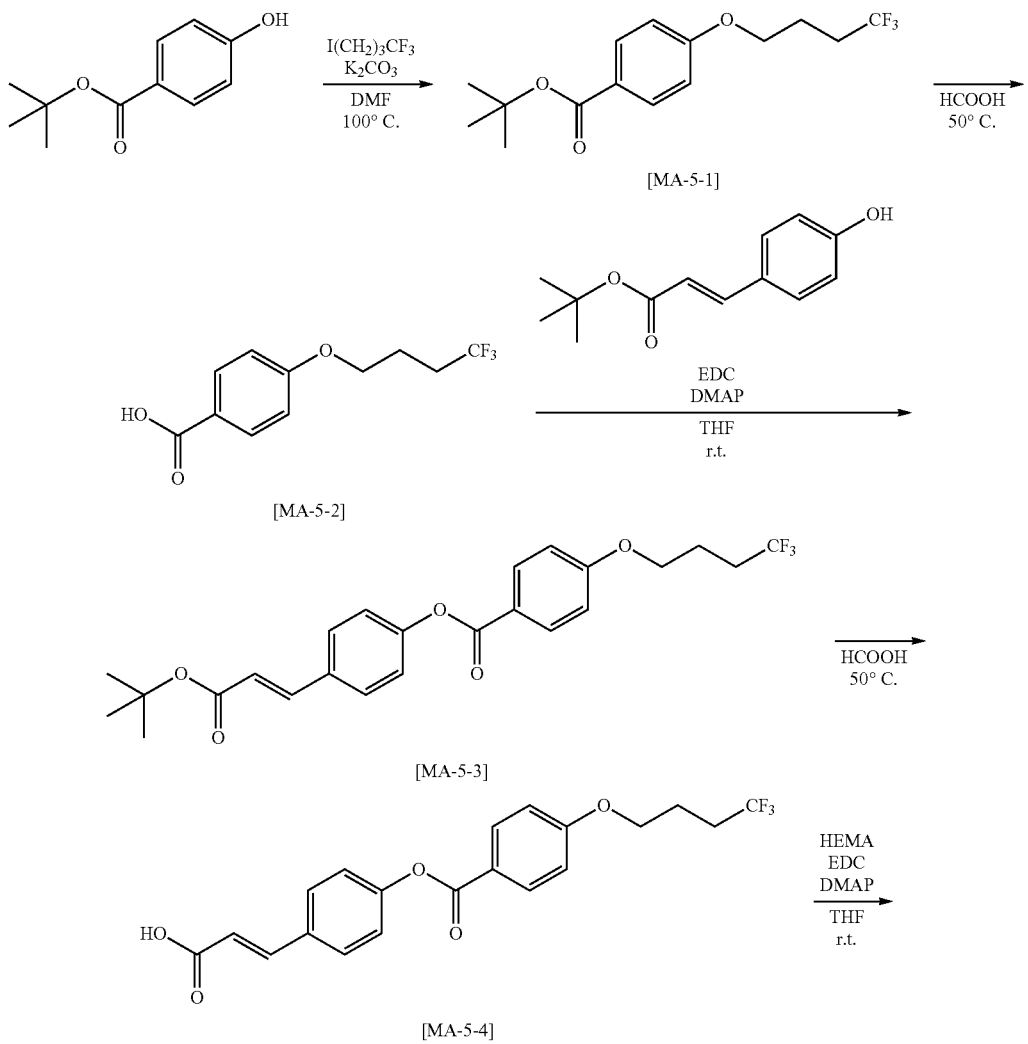

-continued

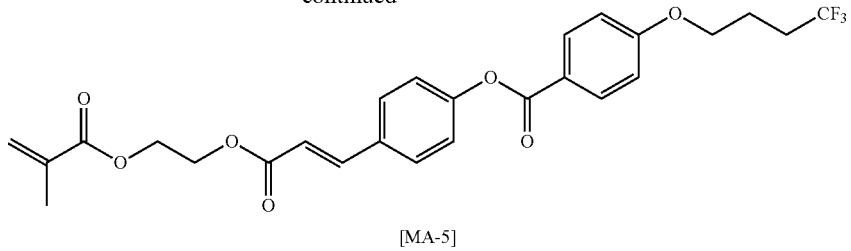

[MA-5]

4-hydroxybenzoic acid tert-butyl (37.1 g, 191 mmol), 1,1,1-trifluoro-4-iodobutane (50.0 g, 210 mmol), potassium carbonate (39.7 g, 287 mmol), and DMF (300 g) were placed in a 500-mL four-necked flask, and stirred under heating at 100° C. After completion of the reaction, the reaction liquid was poured into pure water (1.5 L), and the precipitate was filtrated. The crude product thus obtained was subjected to repulping washing with hexane (300 g), thereby to obtain 42.2 g of [MA-5-1] (white solid) (yield: 73%).

[MA-5-1] (42.2 g, 139 mmol) and formic acid (300 g) were placed in a 500-mL four-necked flask, and stirred under heating at 50° C. After completion of the reaction, the reaction liquid was poured into pure water (1.5 L), and the precipitate was filtrated. The crude product thus obtained was subjected to repulping washing with acetonitrile (80 g), thereby to obtain 31.9 g of [MA-5-2] (white solid) (yield: 92%).

[MA-5-2] (31.9 g, 129 mmol), trans-p-tert-butyl coumarate (42.5 g, 193 mmol), 1-(3-dimethylaminopropyl)-3-ethyl carbodiimide hydrochloride (EDC) (37.0 g, 193 mmol), 4-dimethylaminopyridine (1.59 g, 13 mmol), and THF (300 g) were placed in a 500-mL four-necked flask, and stirred at room temperature. After completion of the reaction, the reaction liquid was poured into pure water (1.5 L), and the precipitate was filtrated. The crude product thus obtained was subjected to repulping washing with methanol (180 g), thereby to obtain 43.6 g of [MA-5-3] (white solid) (yield: 75%).

[MA-5-3] (43.6 g, 97 mmol) and formic acid (300 g) were placed in a 500-mL four-necked flask, and stirred under heating at 50° C. After completion of the reaction, the reaction liquid was poured into pure water (1.5 L), and the precipitate was filtrated. The crude product thus obtained was subjected to repulping washing with acetonitrile (500 g), thereby to obtain 36.6 g of [MA-5-4] (white solid) (yield: 96%). The result of $^1$H-NMR of the objective is given below. The result confirmed that the solid thus obtained is the desired [MA-5-4].
1H NMR (400 MHz, [D$_6$]-DMSO): δ12.46 (s, 1H), 8.08-8.10 (d, 2H), 7.78-7.81 (d, 2H), 7.61-7.65 (d, 1H), 7.31-7.34 (d, 2H), 7.13-7.16 (d, 2H), 6.53-6.57 (d, 1H), 4.16-4.19 (t, 2H), 2.40-2.47 (m, 2H), 1.95-2.02 (m, 2H).

[MA-5-4] (15.0 g, 38 mmol), 2-hydroxyethyl methacrylate (5.47 g, 42 mmol), 1-(3-dimethylaminopropyl)-3-ethyl carbodiimide hydrochloride (EDC) (10.9 g, 57 mmol), 4-dimethylaminopyridine (0.46 g, 3.8 mmol), and THF (150 g) were placed in a 500-mL four-necked flask, and stirred at room temperature. After completion of the reaction, the reaction liquid was poured into ethyl acetate (0.6 L), and extraction was carried out using pure water (500 mL). To the extracted organic layer, anhydrous magnesium sulfate was added and dried by dehydration, and the anhydrous magnesium sulfate was filtered. The filtrate thus obtained was evaporated to remove the solvent with a rotary evaporator. The residue thus obtained was isolated by silica gel column chromatography (ethyl acetate:hexane=1:1 volume ratio), thereby to obtain 16.8 g of [MA-5] (white solid) (yield: 87%). The result of 1H-NMR of the objective is given below. The result confirmed that the solid thus obtained is the desired [MA-5].
1H NMR (400 MHz, [D$_6$]-DMSO): δ8.07-8.11 (d, 2H), 7.84-7.86 (d, 2H), 7.70-7.74 (d, 1H), 7.32-7.34 (d, 2H), 7.13-7.16 (d, 2H), 6.68-6.72 (d, 1H), 6.05 (s, 1H), 5.71 (s, 1H), 4.37-4.44 (m, 4H), 4.16-4.19 (t, 2H), 2.42-2.49 (m, 2H), 1.95-2.02 (m, 2H), 1.88 (s, 3H).

<Measurement of Polymer Molecular Weight>

The molecular weight of each polymer in Synthesis Examples was measured as described below using a normal temperature gel permeation chromatography (GPC) apparatus (SSC-7200) manufactured by Senshu Scientific Co., Ltd., and a column (KD-803, KD-805) manufactured by Showa Denko K.K.

Column temperature: 50° C.

Eluate: N,N'-dimethylformamide (as an additive, 30 mmol/L of lithium bromide monohydrate (LiBr.H$_2$O), 30 mmol/L of phosphoric acid-anhydrous crystal (o-phosphoric acid), and 10 mL/L of tetrahydrofuran (THF))

Flow rate: 1.0 mL/minute

Standard sample for preparing calibration curve: TSK standard polyethylene oxide manufactured by Tosoh Corporation (molecular weight: about 9,000,000, 150,000, 100,000, and 30,000), and polyethylene glycol manufactured by Polymer laboratories Ltd. (molecular weight: about 12,000, 4,000, and 1,000).

Example 1

MA2 (6.19 g, 15.0 mmol) and MOI-BP (8.80 g, 35.0 mmol) were dissolved in CHN (61.6 g), deaerated with a diaphragm pump, and AIBN (0.41 g, 2.5 mmol) was added and deaerated again. Thereafter, the mixture was allowed to react at 55° C. for 13 hours, thereby to obtain a polymer solution of methacrylate. The polymer solution was added dropwise into a mixed solvent (1000 mL) composed of methanol and pure water=5/5, and the precipitate thus obtained was filtrated. The precipitate was washed with methanol, and vacuum-dried in an oven at 40° C., thereby to obtain the methacrylate polymer powder (B). The number average molecular weight of the polymer was 43600, and the weight average molecular weight was 131200.

To the methacrylate polymer powder (B) (1.5 g) thus obtained, CHN (18.0 g) was added, and the mixture was dissolved by stirring at room temperature for 5 hours. To the solution, CR-1 (0.15 g) and PGME (18.0 g) were added, and the mixture was stirred to obtain the liquid crystal aligning agent (B1).

[Preparation of Liquid Crystal Cell]

The liquid crystal aligning agent (B1) obtained in Example 1 was applied by spin coating to the ITO surface of a glass substrate with a transparent electrode made of an ITO film, and dried for 120 seconds on a hot plate at 50° C., and then baked for 20 minutes on a hot plate at 120° C., thereby to form a liquid crystal alignment film having a film thickness of 100 nm. Subsequently, the coating film surface was irradiated with 50 mJ/cm$^2$ of 313 nm linearly polarized ultraviolet light at an irradiation intensity of 4.3 mW/cm$^2$ through a polarizing plate from an angle inclined 40° toward the normal direction of the substrate, thereby to obtain a substrate with a liquid crystal alignment film. The linearly polarized light UV was prepared by passing a 313 nm bandpass filter through ultraviolet light of a high pressure mercury lamp, and then passing a 313 nm polarizing plate.

Two pieces of the above-described substrate were provided, 4 μm bead spacers were spread on the liquid crystal alignment film of one substrate, and then a sealing agent (XN-1500T manufactured by Kyoritsu Chemical Co., Ltd.) was applied. Subsequently, the other substrate was bonded thereto in such a manner that the liquid crystal alignment film surfaces are faced to each other and the alignment direction was 180°, and then the sealing agent was heat-cured at 120° C. for 90 minutes, thereby to prepare empty cells. Into the empty cells, negative liquid crystal (MLC-3022, manufactured by Merck Ltd.) was injected by a reduced pressure injection method, thereby to prepare liquid crystal cells.

[Evaluation of Pretilt Angle]

The pretilt angles of the liquid crystal cells was measured by the Mueller Matrix method using "AxoScan" of AxoMetrix. The result is summarized in Table 1.

[Evaluation of Liquid Crystal Alignment]

After preparing liquid crystal cells, they were subjected to isotropic phase treatment at 120° C. for 1 hour, and then the cell was observed with a polarization microscope; alignment was regarded as good when there was no alignment faulty such as light void and generation of domains, and when uniform driving of liquid crystal was achieved upon application of a voltage to the liquid crystal cells. The result is summarized in Table 1.

Examples 2 to 4

Liquid crystal cells were obtained in a manner similar to [Preparation of liquid crystal cell] in Example 1, except that the irradiation amount of polarized ultraviolet light was changed to 20, 100, and 400 mJ/cm$^2$. Additionally, the pretilt angles and liquid crystal cell alignment were evaluated in the same manner as in Example 1.

Examples 5 and 6

Liquid crystal cells were obtained in a manner similar to [Preparation of liquid crystal cell] in Example 1, except that the baking temperature of the liquid crystal alignment film in Example 1 was changed to 100° C. (Example 5) and 140° C. (Example 6). Additionally, the pretilt angles and liquid crystal cell alignment were evaluated in the same manner as in Example 1.

Example 7

A liquid crystal aligning agent was prepared in a manner similar to Example 1, except that the addition amount of CR-1 to be introduced was changed to 0.3 g, and the pretilt angles and liquid crystal cell alignment were evaluated.

Examples 8 and 9

A liquid crystal aligning agent was prepared in a manner similar to Example 1, except that the specific compound to be introduced was changed from CR-1 to CR-2, and the addition amount was changed to 0.15 g and 0.3 g, and the pretilt angles and liquid crystal cell alignment were evaluated.

Example 10

A liquid crystal aligning agent was prepared in a manner similar to Example 1, except that the specific compound to be introduced was changed from CR-1 to CR-3, and the pretilt angles and liquid crystal cell alignment were evaluated.

Example 11

MA2 (4.13 g, 10.0 mmol) and MOI-BP (2.51 g, 10.0 mmol) were dissolved in CHN (27.2 g), deaerated with a diaphragm pump, and AIBN (0.17 g, 1.0 mmol) was added and deaerated again. Thereafter, the mixture was allowed to react at 55° C. for 13 hours, thereby to obtain a polymer solution of methacrylate. The polymer solution was added dropwise into a mixed solvent (400 mL) composed of methanol and pure water=5/5, and the precipitate thus obtained was filtrated. The precipitate was washed with methanol, and vacuum-dried in an oven at 40° C., thereby to obtain the methacrylate polymer powder (C). The number average molecular weight of the polymer was 41300, and the weight average molecular weight was 121100.

To the methacrylate polymer powder (C) (1.5 g) thus obtained, CHN (18.0 g) was added, and the mixture was dissolved by stirring at room temperature for 5 hours. To the solution, CR-1 (0.15 g) and PGME (18.0 g) were added, and the mixture was stirred to obtain the liquid crystal aligning agent (C1). Subsequently, liquid crystal cells were prepared in a manner similar to Example 1, and the pretilt angles and liquid crystal cell alignment were evaluated.

Example 12

MA3 (4.41 g, 10.0 mmol) and MOI-BP (2.51 g, 10.0 mmol) were dissolved in CHN (28.3 g), deaerated with a diaphragm pump, and AIBN (0.17 g, 1.0 mmol) was added and deaerated again. Thereafter, the mixture was allowed to react at 55° C. for 13 hours, thereby to obtain a polymer solution of methacrylate. The polymer solution was added dropwise into a mixed solvent (400 mL) composed of methanol and pure water=5/5, and the precipitate thus obtained was filtrated. The precipitate was washed with methanol, and vacuum-dried in an oven at 40° C., thereby to obtain the methacrylate polymer powder (D). The number average molecular weight of the polymer was 42100, and the weight average molecular weight was 128500.

To the methacrylate polymer powder (D) (1.5 g) thus obtained, CHN (18.0 g) was added, and the mixture was dissolved by stirring at room temperature for 5 hours. To the solution, CR-1 (0.15 g) and PGME (18.0 g) were added, and the mixture was stirred to obtain the liquid crystal aligning agent (D1). Subsequently, liquid crystal cells were prepared in a manner similar to Example 1, and the pretilt angles and liquid crystal cell alignment were evaluated.

Example 13

MA2 (2.48 g, 6.0 mmol) and MOI (2.17 g, 14.0 mmol) were dissolved in CHN (19.3 g), deaerated with a diaphragm pump, and AIBN (0.17 g, 1.0 mmol) was added and deaerated again. Thereafter, the mixture was allowed to react at 55° C. for 13 hours, thereby to obtain a polymer solution of methacrylate. The polymer solution was added dropwise into a mixed solvent (300 mL) composed of diethyl ether and hexane=4/6, and the precipitate thus obtained was filtrated. The precipitate was washed with a mixed solvent of diethyl ether and hexane=4/6, and vacuum-dried in an oven at 40° C., thereby to obtain the methacrylate polymer powder (E). The number average molecular weight of the polymer was 25000, and the weight average molecular weight was 102000.

To the methacrylate polymer powder (E) (1.5 g) thus obtained, CHN (18.0 g) was added, and the mixture was dissolved by stirring at room temperature for 5 hours. To the solution, CR-1 (0.15 g) and PGMEA (18.0 g) were added, and the mixture was stirred to obtain the liquid crystal aligning agent (E1). Subsequently, liquid crystal cells were prepared in a manner similar to Example 1, and the pretilt angles and liquid crystal cell alignment were evaluated.

Examples 14 and 15

The pretilt angles and liquid crystal cell alignment were evaluated in a manner similar to Example 13, except that the baking conditions for the liquid crystal alignment film in Example 13 were changed to 100° C. for 20 minutes (Example 14) and 140° C. for 5 minutes (Example 15).

Example 16

MA2 (2.48 g, 6.0 mmol) and MOI-DEM (4.41 g, 14.0 mmol) were dissolved in CHN (28.2 g), deaerated with a diaphragm pump, and AIBN (0.17 g, 1.0 mmol) was added and deaerated again. Thereafter, the mixture was allowed to react at 55° C. for 12 hours, thereby to obtain a polymer solution of methacrylate. The polymer solution was added dropwise into a mixed solvent (400 mL) of methanol and pure water=1.5/8.5, and the precipitate thus obtained was filtrated. The precipitate was washed with a mixed solvent composed of methanol and pure water=1.5/8.5, and vacuum-dried in an oven at 40° C., thereby to obtain the methacrylate polymer powder (F). The number average molecular weight of the polymer was 36400, and the weight average molecular weight was 117200.

To the methacrylate polymer powder (F) (1.5 g) thus obtained, CHN (18.0 g) was added, and the mixture was dissolved by stirring at room temperature for 5 hours. To the solution, CR-1 (0.15 g) and PGME (18.0 g) were added, and the mixture was stirred to obtain the liquid crystal aligning agent (F1). Subsequently, liquid crystal cells were prepared in a manner similar to Example 1, and the pretilt angles and liquid crystal cell alignment were evaluated.

Example 17

MA2 (2.48 g, 6.0 mmol), MOI-BP (2.51 g, 10.0 mmol), and CHMI (0.72 g, 4.0 mmol) were dissolved in CHN (33.3 g), deaerated with a diaphragm pump, and AIBN (0.17 g, 1.0 mmol) was added and deaerated again. Thereafter, the mixture was allowed to react at 55° C. for 15 hours, thereby to obtain a polymer solution of methacrylate. The polymer solution was added dropwise into a mixed solvent (500 mL) composed of methanol and pure water=5/5, and the precipitate thus obtained was filtrated. The precipitate was washed with methanol, and vacuum-dried in an oven at 40° C., thereby to obtain the methacrylate polymer powder (G). The number average molecular weight of the polymer was 26500, and the weight average molecular weight was 87100.

To the methacrylate polymer powder (G) (1.5 g) thus obtained, CHN (18.0 g) was added, and the mixture was dissolved by stirring at room temperature for 5 hours. To the solution, CR-1 (0.15 g) and PGME (18.0 g) were added, and the mixture was stirred to obtain the liquid crystal aligning agent (G1). Subsequently, liquid crystal cells were prepared in a manner similar to Example 1, and the pretilt angles and liquid crystal cell alignment were evaluated.

Example 18

HEMA (19.5 g, 150.0 mmol) was dissolved in PGME (83.2 g), deaerated with a diaphragm pump, and AIBN (1.25 g, 7.5 mmol) was added and deaerated again. Thereafter, the mixture was allowed to react at 80° C. for 12 hours, thereby to obtain the polymer solution of methacrylate (H). The number average molecular weight of the polymer was 4800, and the weight average molecular weight was 5700.

Subsequently, to the methacrylate polymer powder (B) (1.5 g) obtained in Example 1, CHN (18.0 g) was added, and the mixture was stirred at room temperature for 5 hours. To the solution, the polymer solution (H) obtained above (7.5 g) (the mass of the HEMA-derived polymer in 7.5 g of the polymer solution (H): 1.5 g) and PGME (3.0 g) were added, and the mixture was stirred to obtain the liquid crystal aligning agent (H1). Since the HEMA-derived polymer has two or more hydroxyl groups, in the present example, the polymer was used as the component (B): specific compound of the present invention.

Subsequently, liquid crystal cells were prepared in a manner similar to Example 1, and the pretilt angles and liquid crystal cell alignment were evaluated.

Example 19

To the methacrylate polymer powder (B) (1.0 g) obtained in Example 1, CHN (14.9 g) was added, and the mixture was stirred at room temperature for 5 hours. To the solution, the polymer solution (H) obtained in Example 18 (11.7 g) (the mass of the HEMA-derived polymer in 7.5 g of the polymer solution (H): 2.3 g) and PGME (5.5 g) were added, and the mixture was stirred to obtain the liquid crystal aligning agent (H2). Since the HEMA-derived polymer has two or more hydroxyl groups, in the present example, the polymer was used as the component (B): specific compound of the present invention.

Subsequently, liquid crystal cells were prepared in a manner similar to Example 1, and the pretilt angles and liquid crystal cell alignment were evaluated.

Example 20

MA2 (3.30 g, 8.0 mmol), MOI-BP (7.04 g, 28.0 mmol), and MA6 (1.77 g, 4.0 mmol) were dissolved in CHN (49.7 g), deaerated with a diaphragm pump, and AIBN (0.33 g, 2.0 mmol) was added and deaerated again. Thereafter, the mixture was allowed to react at 55° C. for 13 hours, thereby to obtain a polymer solution of methacrylate. The polymer solution was added dropwise into a mixed solvent (700 mL) composed of methanol and pure water=5/5, and the precipitate thus obtained was filtrated. The precipitate was washed with methanol, and vacuum-dried in an oven at 40° C., thereby to obtain the methacrylate polymer powder (J). The number average molecular weight of the polymer was 57000, and the weight average molecular weight was 115000.

To the methacrylate polymer powder (J) (1.5 g) thus obtained, CHN (18.0 g) was added, and the mixture was dissolved by stirring at room temperature for 5 hours. To the solution, CR-1 (0.15 g) and PGME (18.0 g) were added, and the mixture was stirred to obtain the liquid crystal aligning agent (J1). Subsequently, liquid crystal cells were prepared in a manner similar to Example 1, and the pretilt angles and liquid crystal cell alignment were evaluated.

Example 21

MA2 (4.13 g, 10.0 mmol), MOI-BP (7.04 g, 28.0 mmol), and MA7 (0.68 g, 2.0 mmol) were dissolved in CHN (48.7 g), deaerated with a diaphragm pump, and AIBN (0.33 g, 2.0 mmol) was added and deaerated again. Thereafter, the mixture was allowed to react at 55° C. for 13 hours, thereby to obtain a polymer solution of methacrylate. The polymer solution was added dropwise into a mixed solvent (700 mL) composed of methanol and pure water=5/5, and the precipitate thus obtained was filtrated. The precipitate was washed with methanol, and vacuum-dried in an oven at 40° C., thereby to obtain the methacrylate polymer powder (K). The number average molecular weight of the polymer was 40000, and the weight average molecular weight was 138000.

To the methacrylate polymer powder (K) (1.5 g) thus obtained, CHN (18.0 g) was added, and the mixture was dissolved by stirring at room temperature for 5 hours. To the solution, CR-1 (0.15 g) and PGME (18.0 g) were added, and the mixture was stirred to obtain the liquid crystal aligning agent (K1). Subsequently, liquid crystal cells were prepared in a manner similar to Example 1, and the pretilt angles and liquid crystal cell alignment were evaluated.

Example 22

MA2 (4.95 g, 12.0 mmol), MOI-BP (6.03 g, 24.0 mmol), and MA8 (0.67 g, 4.0 mmol) were dissolved in CHN (47.9 g), deaerated with a diaphragm pump, and AIBN (0.33 g, 2.0 mmol) was added and deaerated again. Thereafter, the mixture was allowed to react at 55° C. for 13 hours, thereby to obtain a polymer solution of methacrylate. The polymer solution was added dropwise into a mixed solvent (700 mL) composed of methanol and pure water=5/5, and the precipitate thus obtained was filtrated. The precipitate was washed with methanol, and vacuum-dried in an oven at 40° C., thereby to obtain the methacrylate polymer powder (L). The number average molecular weight of the polymer was 37000, and the weight average molecular weight was 123000.

To the methacrylate polymer powder (L) (1.5 g) thus obtained, CHN (18.0 g) was added, and the mixture was dissolved by stirring at room temperature for 5 hours. To the solution, CR-1 (0.15 g) and PGME (18.0 g) were added, and the mixture was stirred to obtain the liquid crystal aligning agent (L1). Subsequently, liquid crystal cells were prepared in a manner similar to Example 1, and the pretilt angles and liquid crystal cell alignment were evaluated.

Example 23

MA2 (4.95 g, 12.0 mmol), MOI-BP (6.03 g, 24.0 mmol), and MA9 (0.87 g, 4.0 mmol) were dissolved in CHN (48.7 g), deaerated with a diaphragm pump, and AIBN (0.33 g, 2.0 mmol) was added and deaerated again. Thereafter, the mixture was allowed to react at 55° C. for 13 hours, thereby to obtain a polymer solution of methacrylate. The polymer solution was added dropwise into a mixed solvent (700 mL) composed of methanol and pure water=5/5, and the precipitate thus obtained was filtrated. The precipitate was washed with methanol, and vacuum-dried in an oven at 40° C., thereby to obtain the methacrylate polymer powder (M). The number average molecular weight of the polymer was 38000, and the weight average molecular weight was 128000.

CHN (18.0 g) was added to the methacrylate polymer powder (M) (1.5 g) thus obtained, and dissolved by stirring at room temperature for 5 hours. To the solution, CR-1 (0.15 g) and PGME (18.0 g) were added, and the mixture was stirred to obtain the liquid crystal aligning agent (M1). Subsequently, liquid crystal cells were prepared in a manner similar to Example 1, and the pretilt angles and liquid crystal cell alignment were evaluated.

Comparative Example 1

MA2 (6.19 g, 15.0 mmol) and MOI-BP (8.80 g, 35.0 mmol) were dissolved in CHN (61.6 g), deaerated with a diaphragm pump, and AIBN (0.41 g, 2.5 mmol) was added and deaerated again. Thereafter, the mixture was allowed to react at 55° C. for 13 hours, thereby to obtain a polymer solution of methacrylate. The polymer solution was added dropwise into a mixed solvent (1000 mL) composed of methanol and pure water=5/5, and the precipitate thus obtained was filtrated. The precipitate was washed with methanol, and vacuum-dried in an oven at 40° C., thereby to obtain the methacrylate polymer powder (B). The number average molecular weight of the polymer was 43600, and the weight average molecular weight was 131200.

CHN (18.0 g) and PGME (18.0 g) were added to the methacrylate polymer powder (B) (1.5 g) thus obtained, and the mixture was dissolved under stirring at room temperature for 5 hours, thereby to obtain the liquid crystal aligning agent (B2).

[Preparation of Liquid Crystal Cells]

Liquid crystal cells were prepared in a manner similar to [Preparation of liquid crystal cell] in Example 1, except that the liquid crystal aligning agent (B2) obtained in Comparative Example 1 was used in place of the liquid crystal aligning agent (B1) obtained in Example 1. [Evaluation of pretilt angles] and [Evaluation of liquid crystal cell alignment]

The pretilt angles were measured in the same manner as in Example 1. Additionally, liquid crystal cell alignment was evaluated in the same manner as in Example 1. The results are summarized in Table 1.

Comparative Example 2

MA5 (5.06 g, 10.0 mmol) was dissolved in NMP (20.6 g), deaerated with a diaphragm pump, and AIBN (0.08 g, 0.5 mmol) was added and deaerated again. Thereafter, the mixture was allowed to react at 55° C. for 13 hours, thereby to obtain a polymer solution of methacrylate. The polymer solution was added dropwise into a mixed solvent (300 mL) composed of methanol and pure water=5/5, and the precipitate thus obtained was filtrated. The precipitate was washed with a mixed solvent composed of methanol and pure water=5/5, and vacuum-dried in an oven at 40° C., thereby to obtain the methacrylate polymer powder (I). The number average molecular weight of the polymer was 39400, and the weight average molecular weight was 119800.

To the methacrylate polymer powder (I) (1.5 g) thus obtained, CHN (18.0 g) and PGME (18.0 g) were added, and the mixture was dissolved under stirring at room temperature for 5 hours, thereby to obtain the liquid crystal aligning agent (I1). Subsequently, comparative liquid crystal cells were prepared in a manner similar to Example 1, and the pretilt angles and liquid crystal cell alignment were evaluated.

Examples show that the combination of the specific polymer and the specific compound of the present invention allowed to obtain good pretilt angles even by baking at low temperatures of 140° C. or lower.

On the other hand, as indicated by Comparative Examples, good pretilt angles and liquid crystal alignment were not obtained only by the specific polymer alone. The reason for this is likely that the anisotropy imparted to the side chains by photoreaction was disappeared by curing of the sealing agent and heating during isotropic phase treatment.

TABLE 1

|  | Specific Polymer | Specific compound | Specific compound amount % by mass/ polymer | Baking conditions ° C./min. | Exposure dose (mJ/cm$^2$) | Pretilt angle (°) | Liquid crystal alignment |
|---|---|---|---|---|---|---|---|
| Ex. 1 | B | CR-1 | 10 | 120/20 | 50 | 88.2 | Good |
| Ex. 2 | B | CR-1 | 10 | 120/20 | 20 | 88.3 | Good |
| Ex. 3 | B | CR-1 | 10 | 120/20 | 100 | 87.9 | Good |
| Ex. 4 | B | CR-1 | 10 | 120/20 | 400 | 88.3 | Good |
| Ex. 5 | B | CR-1 | 10 | 100/20 | 50 | 88.4 | Good |
| Ex. 6 | B | CR-1 | 10 | 140/20 | 50 | 88.1 | Good |
| Ex. 7 | B | CR-1 | 20 | 120/20 | 50 | 88.2 | Good |
| Ex. 8 | B | CR-2 | 5 | 120/20 | 50 | 88.5 | Good |
| Ex. 9 | B | CR-2 | 10 | 120/20 | 50 | 88.2 | Good |
| Ex. 10 | B | CR-3 | 10 | 120/20 | 50 | 88.1 | Good |
| Ex. 11 | C | CR-1 | 10 | 120/20 | 50 | 88.5 | Good |
| Ex. 12 | D | CR-1 | 10 | 120/20 | 50 | 88.6 | Good |
| Ex. 13 | E | CR-1 | 10 | 120/20 | 50 | 87.9 | Good |
| Ex. 14 | E | CR-1 | 10 | 100/20 | 50 | 88.1 | Good |
| Ex. 15 | E | CR-1 | 10 | 140/5 | 50 | 88.1 | Good |
| Ex. 16 | F | CR-1 | 10 | 120/20 | 50 | 88.5 | Good |
| Ex. 17 | G | CR-1 | 10 | 120/20 | 50 | 88.3 | Good |
| Ex. 18 | B | H | 100 | 120/20 | 50 | 89.2 | Good |
| Ex. 19 | B | H | 230 | 120/20 | 50 | 88.9 | Good |
| Ex. 20 | J | CR-1 | 10 | 120/20 | 50 | 89.4 | Good |
| Ex. 21 | K | CR-1 | 10 | 120/20 | 50 | 89.4 | Good |
| Ex. 22 | L | CR-1 | 10 | 120/20 | 50 | 89.3 | Good |
| Ex. 23 | M | CR-1 | 10 | 120/20 | 50 | 89.4 | Good |
| Comp. 1 | B | — | 0 | 120/20 | 50 | 90 | Bad |
| Comp. 2 | I | — | 0 | 120/20 | 50 | 89.8 | Bad |

What is claimed is:

1. A liquid crystal aligning agent comprising the following component (A), the following component (B), and an organic solvent:
    Component (A): a polymer comprising a (A-1) site having an isocyanate group and/or a blocked isocyanate group; and a (A-2) site having photoalignment;
    Component (B): a compound comprising in a molecule of the compound two or more functional groups, each of which is at least one selected from the group consisting of an amino group and a hydroxyl group,
    wherein the (A-1) site having an isocyanate group and/or a blocked isocyanate group is represented by following formula (1), wherein Ia represents an isocyanate group or a blocked isocyanate group,
    Sa represents a spacer unit, the bonding pointer left of Sa represents bonding to the backbone of a polymer of the component (A) optionally via a spacer:

$$—S_a—I_a \qquad (1),$$

wherein the (A-1) site having an isocyanate group and/or a blocked isocyanate group is derived from a monomer represented by the formula (1m),

$$M_a\text{-}M_b\text{-}[\text{-}S_a—I_a]_c \qquad (1m);$$

wherein Ma represents a first polymerizable group,
Mb represents a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, a tetravalent alicyclic group, a divalent condensed cyclic group, a trivalent condensed cyclic group or a tetravalent condensed cyclic group, wherein each group may be unsubstituted, or one or more hydrogen atoms in each group may be substituted with a fluorine atom, a chlorine atom, a cyano group, a methyl group, or a methoxy group, Sa represents a spacer unit,
Ia represents an isocyanate group or a blocked isocyanate group, and
c represents an integer of 1 to 3; and
wherein Sa in the formula (1) and/or the formula (1m) is represented by the formula (2):

$$—W_1\text{-}A_1\text{-}W_2\text{-}A_2\text{-}W_3— \qquad (2)$$

wherein the bonding left of $W_1$ represents bonding to Mb, the bonding right of $W_3$ represents bonding to Ia,
$W_1$, $W_2$, and $W_3$ each independently represents a single bond, a divalent heterocycle, —(CH$_2$)$_n$— wherein n represents 1 to 20, —OCH₂—, —CH₂O—, —COO—, —OCO—, —CH=CH—, —CF=CF—, —CF₂O—, —OCF₂—, —CF₂CF₂— or —C≡C—, wherein one or more non-adjacent CH₂ groups in these substituents may be independently substituted with —O—, —CO—, —CO—O—, —O—CO—, —Si(CH₃)₂—O—Si(CH₃)₂—, —NR—, —NR—CO—, —CO—NR—, —NR—CO—O—, —OCO—NR—, —NR—CO—NR—, —CH=CH—, —C≡C— or —O—CO—O—, wherein R represents independently a hydrogen or a linear or branched alkyl group having a carbon number of 1 to 5, A₁ and A₂ each independently represents a divalent aromatic group, a divalent alicyclic group, a divalent heterocyclic group, or a divalent condensed cyclic group, wherein each group may be unsubstituted, or one or more hydrogen atoms in each group may be substituted with a fluorine atom, a chlorine atom, a cyano group, a methyl group or a methoxy group.

2. The liquid crystal aligning agent according to claim 1, wherein Ia in the formula (1) is selected from the group consisting of the following structures Ia-1 to Ia-8:

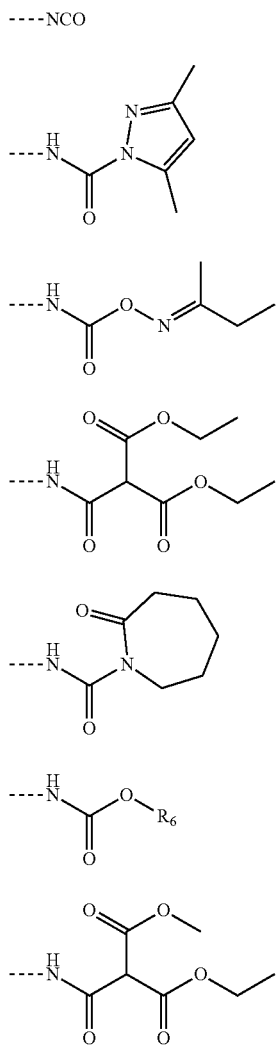

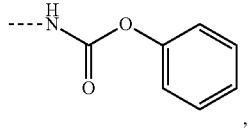

wherein the broken line represents bonding to Sa in the formula (1), and

R₆ represents a linear or branched alkyl group having a carbon number of 1 to 10, wherein one or more non-adjacent CH₂ groups may be independently substituted with an oxygen atom.

3. The liquid crystal aligning agent according to claim 1, wherein the (A-2) site having photoalignment is represented by the following formula (3):

$$-S_b-I_b \quad (3)$$

wherein Ib is a monovalent organic group comprising a photoreactive group having photoalignment, Sb represents a spacer unit, the bonding pointer left of Sb means bonding to the backbone of the polymer of the component (A) optionally via a spacer.

4. The liquid crystal aligning agent according to claim 1, wherein the (A-2) site having photoalignment is derived from a monomer represented by the following formula (3m):

$$M_c\text{-}M_d(-S_b-I_b)_d \quad (3m),$$

wherein Mc represents a second polymerizable group,

M_d represents a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, a tetravalent alicyclic group, a divalent condensed cyclic group, a trivalent condensed cyclic group or a tetravalent condensed cyclic group, wherein each group may be unsubstituted, or one or more hydrogen atoms in each group may be substituted with a fluorine atom, a chlorine atom, a cyano group, a methyl group, or a methoxy group, Sb represents a spacer unit, Ib is a monovalent organic group having a photoreactive group having photoalignment, and d is an integer of 1 to 3.

5. The liquid crystal aligning agent according to claim 4, wherein Sb is the formula (3m) is represented by the following formula (2):

$$-W_1\text{-}A_1\text{-}W_2\text{-}A_2\text{-}W_3- \quad (2),$$

wherein bonding left of W₁ represents bonding to Md, bonding right of W₃ represents bonding to I_b, W₁, W₂, and W₃ each independently represents a single bond, a divalent heterocycle, —(CH₂)ₙ— wherein n represents 1 to 20, —OCH₂—, —CH₂O—, —COO—, —OCO—, —CH=CH—, —CF=CF—, —CF₂O—, —OCF₂—, —CF₂CF₂— or —C≡C—, wherein one or more non-adjacent CH₂ groups in these substituents may be independently substituted with —O—, —CO—, —CO—O—, —O—CO—, —Si(CH₃)₂—O—Si(CH₃)₂—, —NR—, —NR—CO—, —CO—NR—, —NR—CO—O—, —OCO—NR—, —NR—CO—NR—, —CH=CH—, —C≡C— or —O—CO—O— wherein R independently represents a hydrogen or a linear or branched alkyl group having a carbon number of 1 to 5, A₁ and A₂ each independently represents a divalent aromatic group, a divalent alicyclic group, a divalent heterocyclic group or a divalent condensed cyclic group, wherein each group may be unsubstituted, or one or more hydrogen atoms in each group may be substituted with a fluorine atom, a chlorine atom, a cyano group, a methyl group, or a methoxy group.

6. The liquid crystal aligning agent according to claim 3, wherein the photoreactive group of the formula Ib has the group represented by the following formulae (III)-1 to (III)-4:

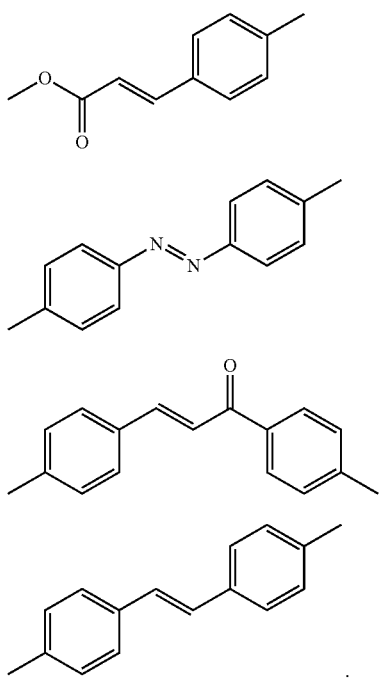

7. The liquid crystal aligning agent according to claim 4, wherein the monomer represented by the formula (3m) is a monomer represented by the following formula (3m)-1:

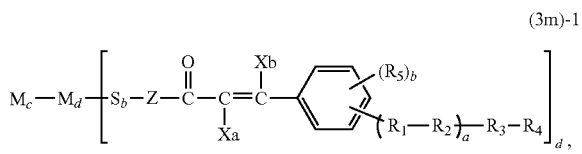

wherein Mc, Md and d are as defined in claim 4,
Sb is an alkylene group having a carbon number of 1 to 10 or a divalent aromatic group,
Z is an oxygen atom or a sulfur atom,
Xa and Xb each represents independently a hydrogen atom, a fluorine atom, a chlorine atom, a cyano group or an alkyl group having a carbon number of 1 to 3,
$R_1$ is a single bond, an oxygen atom, —COO— or —OCO—,
$R_2$ is a divalent aromatic group, a divalent alicyclic group, a divalent heterocyclic group or a divalent condensed cyclic group,
$R_3$ is a single bond, an oxygen atom, —COO— or —OCO—,
$R_4$ is an alkyl group having a carbon number of 1 to 20 or a monovalent organic group including an alicyclic group having an carbon number of 3 to 20,
$R_5$ represents a fluorine atom or a cyano group,
a is an integer of 0 to 3, and
b is an integer of 0 to 4.

8. The liquid crystal aligning agent according to claim 1, wherein the first polymerizable group is independently at least one group selected from the group consisting of (meth)acrylate, fumarate, maleate, α-methylene-γ-butyrolactone, styrene, vinyl, maleimide, norbornene, acrylamide and siloxane.

9. The liquid crystal aligning agent according to claim 4, wherein the monomer represented by the formula (3m) is selected from the group consisting of following formulae MA-1 to MA-5:

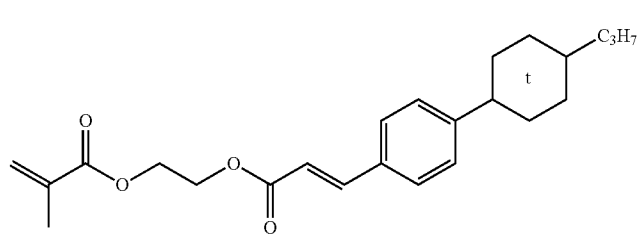

MA-1

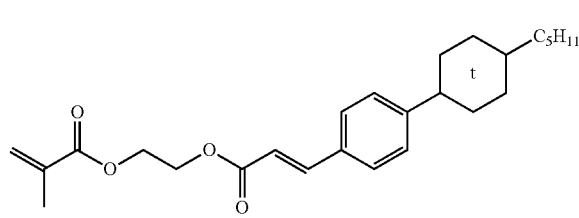

MA-2

-continued

MA-3

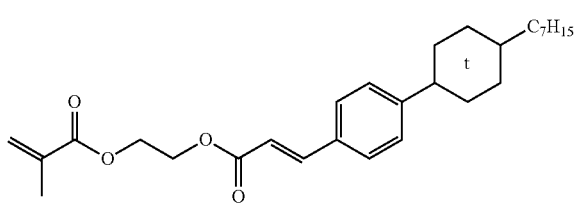

MA-4

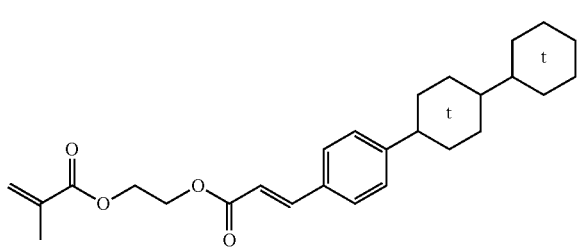

MA-5

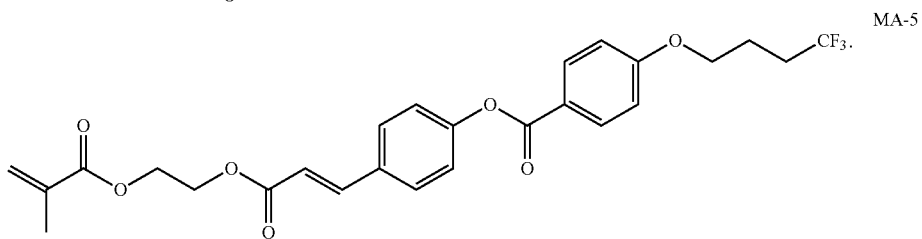

10. The liquid crystal aligning agent according to claim 1, wherein the component (B) is represented by the following formula (4):

$$(T)_m Y \qquad (4),$$

wherein T represents an amino group or a hydroxyl group, Y represents an organic group with a valence of m, and m is an integer of 2 or more.

11. The liquid crystal aligning agent according to claim 1, wherein the component (A) is a polymer, which comprises and are formed from any one compound selected from the group consisting of the following formulae MA-1 to MA-5:

MA-1

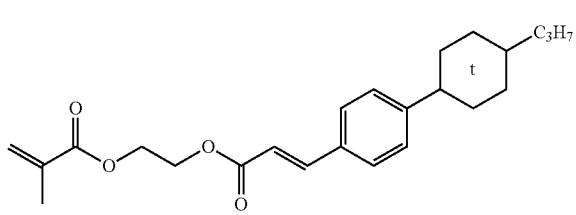

MA-2

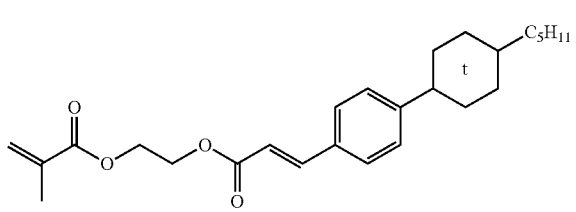

-continued

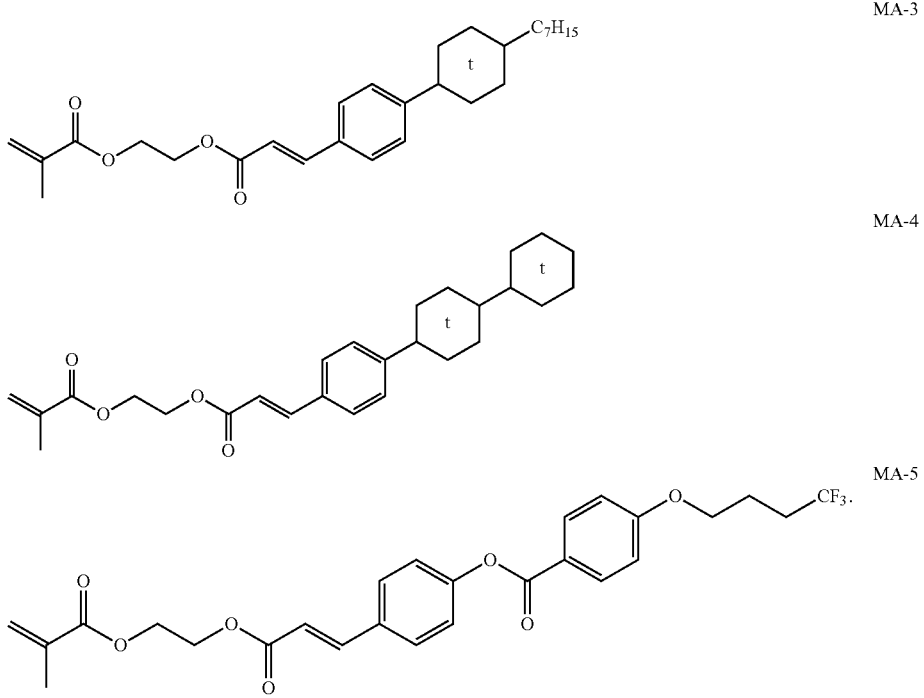

12. A liquid crystal alignment film obtained from the liquid crystal aligning agent according to claim 1.

13. A liquid crystal display element comprising the liquid crystal alignment film according to claim 12.

14. The liquid crystal aligning agent according to claim 4, wherein the second polymerizable group is independently at least one group selected from the group consisting of (meth)acrylate, fumarate, maleate, α-methylene-γ-butyrolactone, styrene, vinyl, maleimide, norbornene, acrylamide and siloxane.

* * * * *